(12) United States Patent
Rodgers et al.

(10) Patent No.: US 7,210,039 B2
(45) Date of Patent: Apr. 24, 2007

(54) DIGITAL RIGHTS MANAGEMENT

(75) Inventors: Alastair Rodgers, Horsforth (GB); Andrew Barlow, Richmond (GB); Neill Robbins, Shipley (GB)

(73) Assignee: Phocis Limited, Leeds (GB)

( * ) Notice: Subject to any disclaimer, the term of this patent is extended or adjusted under 35 U.S.C. 154(b) by 723 days.

(21) Appl. No.: 10/380,365

(22) PCT Filed: Sep. 14, 2001

(86) PCT No.: PCT/GB01/04133

§ 371 (c)(1),
(2), (4) Date: Sep. 9, 2003

(87) PCT Pub. No.: WO02/23314

PCT Pub. Date: Mar. 21, 2002

(65) Prior Publication Data

US 2004/0059929 A1    Mar. 25, 2004

(30) Foreign Application Priority Data

Sep. 14, 2000  (GB) .................................. 0022560.7

(51) Int. Cl.
*G06F 1/24* (2006.01)
(52) U.S. Cl. .................... 713/182; 713/189; 713/161; 713/168

(58) Field of Classification Search ................ 713/182, 713/189, 161, 168
See application file for complete search history.

(56) References Cited

FOREIGN PATENT DOCUMENTS

| EP | 0843449 A2 | 11/1997 |
| EP | 0994404 A1 | 4/2003 |
| GB | 2228807 A | 9/1990 |
| WO | WO 97/14087 | 4/1997 |
| WO | WO 98/42098 | 9/1998 |
| WO | WO 99/31842 | 6/1999 |
| WO | WO 00/58810 | 10/2000 |

OTHER PUBLICATIONS

International Search Report for PCT/GB01/04133, Mar. 18, 2003.
Kaplan, Marc, "IBM Cryptolopes™, SuperDistribution and Digital Rights Management," *SuperDistribution and Digital Rights Management*. Dec. 30, 1996.

*Primary Examiner*—Thomas R. Peeso
(74) *Attorney, Agent, or Firm*—Myers Bigel Sibley & Sajovec PA

(57) ABSTRACT

The present invention relates to digital rights management and more particularly to a system and method for securely publishing and controlling the usage of digital content. Advantageously a publisher or owner of digital content or of a copyright work can distribute securely that work in a secure digital form.

64 Claims, 32 Drawing Sheets

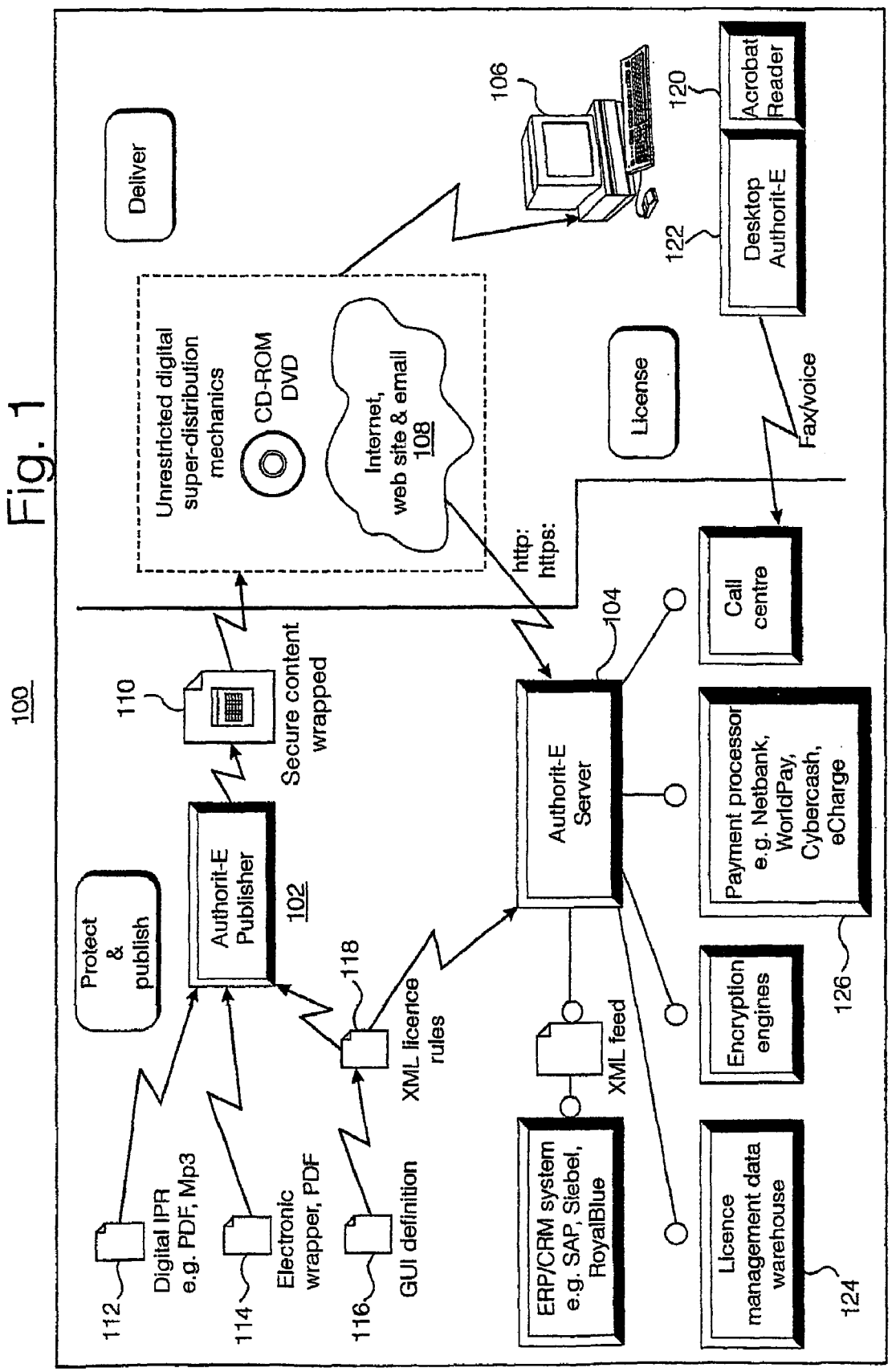

```
- <adrml-publication-request>
<version major=" 0 " minor="1" release="0" build="0" modified="1999-12-13" />
<request-header reference="harry-test" contact name="Mr Charles Allen" e-mail="info@pjosis.com"
  customer.id="100000001" date="2000/05/22 10:59:27" />
- <request-items>
- <item id="19528">
<metadata part.number="harry-test" title ="Death Trip" price="0.66" currency ="GBP"
  publisher="Phocis Ltd" artist="The Stooges" author="Iggy Pop" publication.date="May 2000"
  content.type="mp3" pdf.cover="music33demo.PDF" content.filename="death Trip.mp3" />
- <branding skin.dfm="m33console.txt" skin.html="m33_cover_deathtrip.htm">
  <resource name= "images\m33top.gif" />
  <resource name= "images\stooges.gif" />
  <resource name= "images\m33bot.gif" />
</branding>
<fulfilment process.id="2" />
<trusted.applications applications.id="17" />
<terms terms.id="2" />
</item>
</request-items>
</adrml-publication-request>
```

```
-,store name="PHOCIS country="GB" password="" database="" username=""" NETBANK"     5c02
Merchanturl="http://www.netbanx.com/cgi-bin/phocis-demo/decode.pl"
proclistid="http://authorit-e.webgenerics.com/scripts/pay_nb.dll" currancy="GBP"    5c04
resellerid="100000001"
- <product sku="harry-test">
   <!--   (akutype+     )-->                                5c06           5c08
   <skutype skutype="Full" startorderhtml="authoritestartorder.htm"
   startorderxml="erazorstartorder.xml" confirmorderhtml="authoriteconfirmorder.htm"
   confirmorderxml="erazorconfirmorder.xml" accepthtml="authoriteaccept.htm"       5c14
   acceptxml="erazoraccept.xml" rejectml="authoritereject.htm" rejectxml="erazorreject.xml"
   expiredhtml="authoriteexpired.htm" expiredxml="erazorexpired.xml"
   erorhtml="authoriteerror.htm" errorxml="erazorerror.xml" description="The Stooges: Death
   Trip" price="0.66" />
</product>
</store>
```

Fig. 5c

```xml
- <sku delivery="virtual" product.type="mp3" sku="harry-test" description="The
  Stooges: Death Trip" catalog="PHO001" un="http://www.web-books.com">

- <skutype skutype="Full" description="Full">                                     5d00

- <keyserver type="cdilla">

- <cdilla cdilla.licence="80026000">
        - <reg Typeinstall>

<rsp TypeSubgroupSet ExpiryDate="" SubGroup="1062" />
          <rsp TypeinstallWithExpiry ExpiryDate="" />
        </regTypeinstall>
        - <regTypeDateExtend>
          <rspTypeSubgroupSet ExpiryDate="" SubGroup="1062" />
        - <regTypeDateExtend>
        </regTypeWindBackFix>
        </rspTypeWindBackFix />
          <rspTypeSubgroupSet ExpiryDate="" SubGroup="1062" />
        </regTypeWindBackFix>
        - <regTypeEnableSubgroupLow>
          <rspTypeSubgroupSet ExpiryDate="" SubGroup="1062" />
          <regTypeEnableSubgroupLow>                                                5d02
         -<regTypeEnableSubgroup>
          <rspTypeSubgroupSet ExpiryDate="" SubGroup="1062" />
          <regTypeEnableSubgroup>
         -<regTypeEnableSubgroupA>
          <rspTypeSubgroupSet ExpiryDate="" SubGroup="1062" />
          <regTypeEnableSubgroupA>
         -<regTypeLicenceGenericFix>
         -<rspTypeLicenceGenericFix />
            <rspTypeSubgroupSet ExpiryDate="" SubGroup="1062" />
          <regTypeLicenceGenericFix>
         -<regTypeLicenceRepair>
          <rspTypeLicenceGenericRepair />
            <rspTypeSubgroupSet ExpiryDate="" SubGroup="1062" />
          <regTypeLicenceRepair>
      </cdilla>
    </keyserver>
  - <source.country country.code="GB">
```

Fig. 5d-1

```
<deliver.country country.code="AF" sale.allowed="yes" tax.code="T6" />
<deliver.country country.code="AL" sale.allowed="yes" tax.code="T6" />
<deliver.country country.code="DZ" sale.allowed="yes" tax.code="T6" />
<deliver.country country.code="AS" sale.allowed="yes" tax.code="T6" />
<deliver.country country.code="AD" sale.allowed="yes" tax.code="T6" />
<deliver.country country.code="AO" sale.allowed="yes" tax.code="T6" />
<deliver.country country.code="AI" sale.allowed="yes" tax.code="T6" />
<deliver.country country.code="AQ" sale.allowed="yes" tax.code="T6" />
<deliver.country country.code="AG" sale.allowed="yes" tax.code="T6" />
<deliver.country country.code="AR" sale.allowed="yes" tax.code="T6" />
<deliver.country country.code="AM" sale.allowed="yes" tax.code="T6" />
<deliver.country country.code="ST" sale.allowed="yes" tax.code="T6" />
<deliver.country country.code="SB" sale.allowed="yes" tax.code="T6" />
<deliver.country country.code="ZA" sale.allowed="yes" tax.code="T6" />
<deliver.country country.code="ES" sale.allowed="yes" tax.code="T6" />
<deliver.country country.code="LK" sale.allowed="yes" tax.code="T6" />
<deliver.country country.code="SH" sale.allowed="yes" tax.code="T6" />
<deliver.country country.code="PM" sale.allowed="yes" tax.code="T6" />
<deliver.country country.code="ST" sale.allowed="yes" tax.code="T6" />
<deliver.country country.code="VC" sale.allowed="yes" tax.code="T6" />
<deliver.country country.code="SD" sale.allowed="yes" tax.code="T6" />
<deliver.country country.code="SR" sale.allowed="yes" tax.code="T6" />
<deliver.country country.code="SZ" sale.allowed="yes" tax.code="T6" />
<deliver.country country.code="SE" sale.allowed="yes" tax.code="T6" />
<deliver.country country.code="CH" sale.allowed="yes" tax.code="T6" />
<deliver.country country.code="TW" sale.allowed="yes" tax.code="T6" />
<deliver.country country.code="TD" sale.allowed="yes" tax.code="T6" />
<deliver.country country.code="TZ" sale.allowed="yes" tax.code="T6" />
<deliver.country country.code="TH" sale.allowed="yes" tax.code="T6" />
<deliver.country country.code="TC" sale.allowed="yes" tax.code="T6" />
<deliver.country country.code="TK" sale.allowed="yes" tax.code="T6" />
<deliver.country country.code="TO" sale.allowed="yes" tax.code="T6" />
<deliver.country country.code="TT" sale.allowed="yes" tax.code="T6" />
<deliver.country country.code="TN" sale.allowed="yes" tax.code="T6" />
<deliver.country country.code="TR" sale.allowed="yes" tax.code="T6" />
<deliver.country country.code="TM" sale.allowed="yes" tax.code="T6" />
<deliver.country country.code="TC" sale.allowed="yes" tax.code="T6" />
<deliver.country country.code="TV" sale.allowed="yes" tax.code="T6" />
<deliver.country country.code="ST" sale.allowed="yes" tax.code="T6" />
<deliver.country country.code="UG" sale.allowed="yes" tax.code="T6" />
<deliver.country country.code="UA" sale.allowed="yes" tax.code="T6" />
<deliver.country country.code="AE" sale.allowed="yes" tax.code="T6" />
<deliver.country country.code="US" sale.allowed="yes" tax.code="T6" />
<deliver.country country.code="XX" sale.allowed="yes" tax.code="T6" />
<deliver.country country.code="UY" sale.allowed="yes" tax.code="T6" />
<deliver.country country.code="UM" sale.allowed="yes" tax.code="T6" />
<deliver.country country.code="UZ" sale.allowed="yes" tax.code="T6" />
```

```
<deliver.country country.code="VU" sale.allowed="yes" tax.code="T6" />
<deliver.country country.code="VE" sale.allowed="yes" tax.code="T6" />
<deliver.country country.code="VN" sale.allowed="yes" tax.code="T6" />
<deliver.country country.code="VG" sale.allowed="yes" tax.code="T6" />
 <deliver.country country.code="VI" sale.allowed="yes" tax.code="T6" />
<deliver.country country.code="WF" sale.allowed="yes" tax.code="T6" />
<deliver.country country.code="EH" sale.allowed="yes" tax.code="T6" />
<deliver.country country.code="YE" sale.allowed="yes" tax.code="T6" />
<deliver.country country.code="YU" sale.allowed="yes" tax.code="T6" />
<deliver.country country.code="ZM" sale.allowed="yes" tax.code="T6" />
<deliver.country country.code="ZW" sale.allowed="yes" tax.code="T6" />
```
} 5d04

Fig. 5d-3

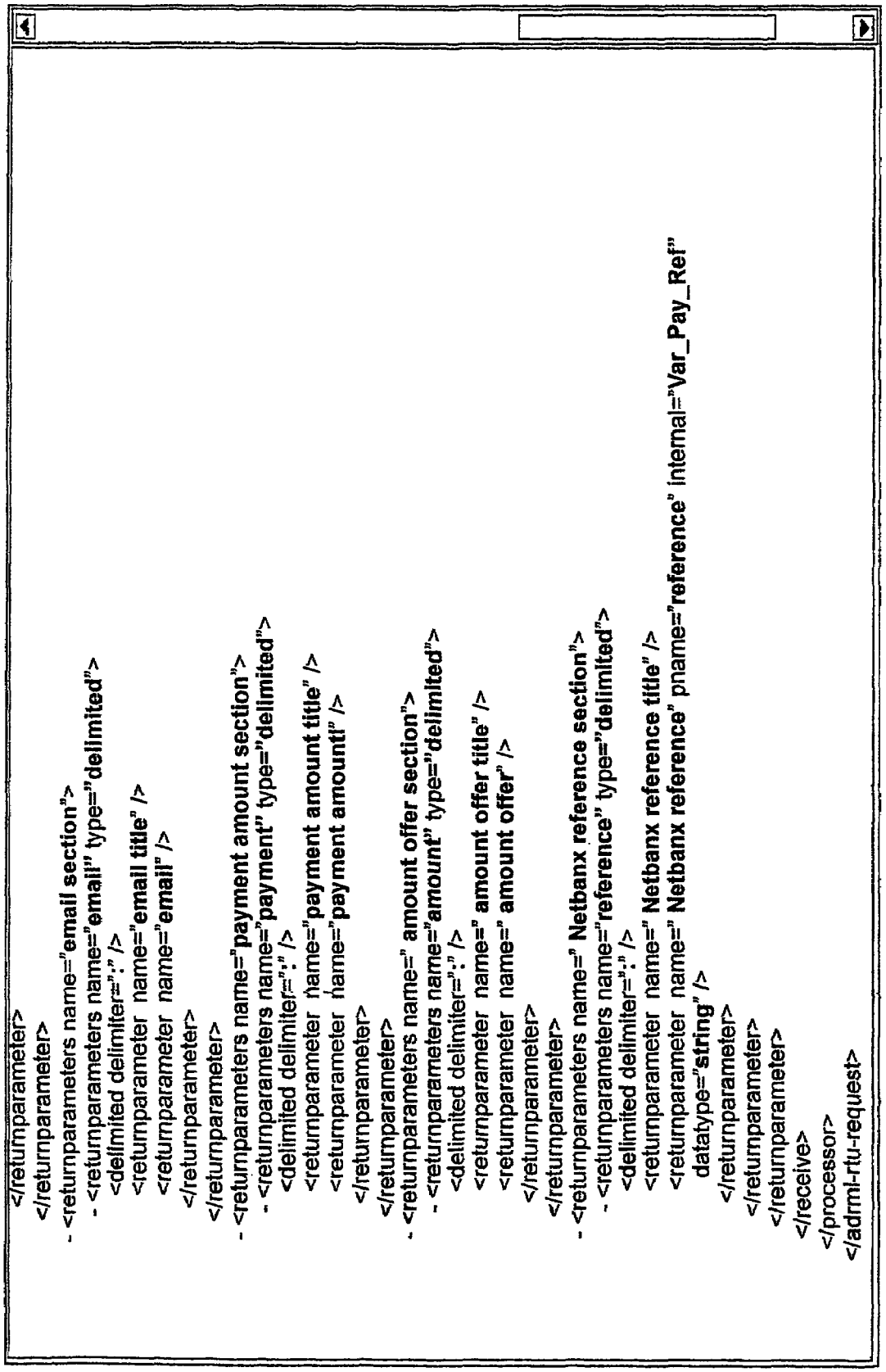

Fig. 12

Razor — The Stooges: Death Trip — GBP 0.78

- 1202 (form area)
- 1204 Submit
- 1206 Cancel
- 1200 (window)

Card number:

Name on card: Mr A N Barlow  Month: 02  Year (expiry): 2001

Title: Mr  First name: Andy  Last name: Barlow

Address: 14 The House

City: City

County: County  Zip: Zip

Country: United Kingdom

E-mail:

Fig. 13

Razor — The Stooges: Death Trip — GBP 0.78

- 1300 (form area)
- 1302 Confirm
- 1304 Cancel

Card number

Name on card: Mr A N Barlow

Title: Mr  Month: 02  Year (expiry): 2001

Address: 14 The House  First name: Andy  Last name: Barlow

City: City

County: County  Zip: Zip

Country: United Kingdom

E-mail: Andy.barlow@phocis.com

Razor PAYMENT ACCEPTED: THANK YOU

Your order for The Stooges: Death Trip has been accepted and your card debited GBP0.78. Please print out this invoice for your records.

| | |
|---|---|
| Invoice No. | NETBANX4TESTPASS |
| Date | 22 May 2000 |
| Name | Mr A N Barlow |
| Address | 14 The House |
| | City |
| County | County |
| Zip | Zip |
| Country | United Kingdom |
| E-mail | Andy.barlow@phocis.com |

| Item | Cost | Qty | Amount |
|---|---|---|---|
| The Stooges: Death Trip | 0.66 | 1 | 0.66 |
| VAT (UK/EC) | 17.50% | | 0.12 |
| | | Total | GBP0.78 |

Razor Limited, Teddington Studios, Broom Rd, Teddington, UK

Delivered with [   e]

Fig. 15

DIGITAL RIGHTS MANAGEMENT

RELATED APPLICATIONS

The present application is a 35 U.S.C. §371 national phase application of PCT International Application No. PCT/GB01/04133, having an international filing date of Sep. 14, 2001, and claiming priority to Great Britain Patent Application No. 0022560.7, filed Sep. 14, 2000, the disclosures of which are incorporated herein by reference in their entireties. The above PCT International Application was published in the English language and has International Publication No. WO 02/23314 A2.

FIELD OF THE INVENTION

The present invention relates to the management of digital content and the usage rights associated with digital content.

BACKGROUND TO THE INVENTION

With the proliferation of the Internet, there has been a corresponding increase in the growth of the on-line dissemination of digital content such as, for example, MP3 music files and audio/visual files, such as, for example, MPEG files. A concern of the owners of any intellectual property rights; such as copyrights, in digital content that is sold via the Internet, is the prevention of the unauthorised copying and further distribution of the digital works. Attempts have been made, via the use of various encryption technologies, to distribute in a secure form digital content. However, once digital content has been legitimately decrypted very little can be done to prevent unauthorised copying and distribution of the digital content.

It is an object of the present invention at least to mitigate some of the above problems.

SUMMARY OF THE INVENTION

Accordingly, a first aspect of the present invention provides a data entity comprising first encrypted data only decodable by a first local application located at a first client machine, second encrypted data usable by a second local application located at the first client machine only after the first encrypted data has been decoded; the second encrypted data representing encrypted digital content.

An embodiment of the present invention further comprises, preferably within the first encrypted data, a reference to a first remote licensing server for providing an identification of the data entity to the first remote licensing server to instigate, in response to providing the identification, transmission of authorisation data from the first remote licensing server to the first client machine to change the data entity from a first state to a second state and thereby allow the second encrypted data to be utilised. It will be appreciated that the first state may correspond to an unlicensed state or to any one of a plurality of licensed states. Similarly, the second state may correspond to an unlicensed state or to any one of a plurality of licensed states. It will be appreciated that digital content can be deemed to be licensed for a limited range of activities or purposes and also concurrently be deemed to be unlicensed for activities or purposes other than such limited activities or purposes.

Advantageously, the first remote licensing server provides the authorisation data, which includes at least one decryption key, to allow the digital content to be decrypted and used by the second local application. The use of a remote licensing server has the advantage of being able to track the use of digital content as well as numerous other advantages that are described hereafter.

A still further aspect of the present invention provides a data processing system for processing a digital content comprising instructions; the digital content is capable of being rendered by an associated application which comprises means for giving effect to the instructions; the system comprising means for receiving a data entity comprising first encrypted data decodable by a first local application located at a first client machine, second encrypted data usable by a second local application, located at the first client machine, only after the first encrypted data has been decoded; the second encrypted data representing an encrypted version of the digital content; the second application being capable of rendering the digital content and lacking the means for giving effect to the instructions.

It will be appreciated that since the second application lacks the means for executing the executable instructions, the instructions are rendered ineffective. This aspect of the present invention finds particular application in rendering, for example, macro implemented viruses, in effective. For example, if the digital content was a Microsoft Word document that contained executable macros, since the second application or viewer using in the present invention is an application other than Microsoft Word, the conventional interpretation of and giving effect to those macros is disabled or rendered ineffective since the second application lacks the means for doing so. Therefore, documents which potentially contain harmful computer viruses can be viewed without fear of the consequences of opening a virus-infected document.

It will be still further appreciated that the ability to open virus-infected documents without the virus being or becoming effective, allows infected documents to be recovered to an uninfected form.

BRIEF DESCRIPTION OF THE DRAWINGS

Embodiments of the present invention will now be described, by way of example only, with reference to the accompanying drawings in which:

FIG. 3*b* provides an illustration of an embodiment of a Job Request File, which contains an XML job ticket and resources required to perform secure wrapping;

FIG. 3*c* shows a content definition screen illustrating the content, branding and metadata for the digital content;

FIG. 3*d* shows a Job definition screen illustrating the publisher, licensing process, pricing etc;

FIG. 5c shows an embodiment of the Stores XML, which defines the licensing process, RTU (Rights To Use) interface and pricing information;

FIGS. 5d-1–5d-3 shows portions of an embodiment of the Inventory XML;

FIGS. 5e-1, 5e-2, 5e-3 and 5f show a mapping between the DRM system variables and those variables required by a third party e-commerce provider;

FIG. 12 illustrates the start of a licensing process according to an embodiment;

FIG. 13 illustrates a confirm order licensing process screen capture;

FIG. 15 illustrates an invoice that can be printed as a record of receipt of payment;

DESCRIPTION OF THE PREFERRED EMBODIMENTS

Figure 5:
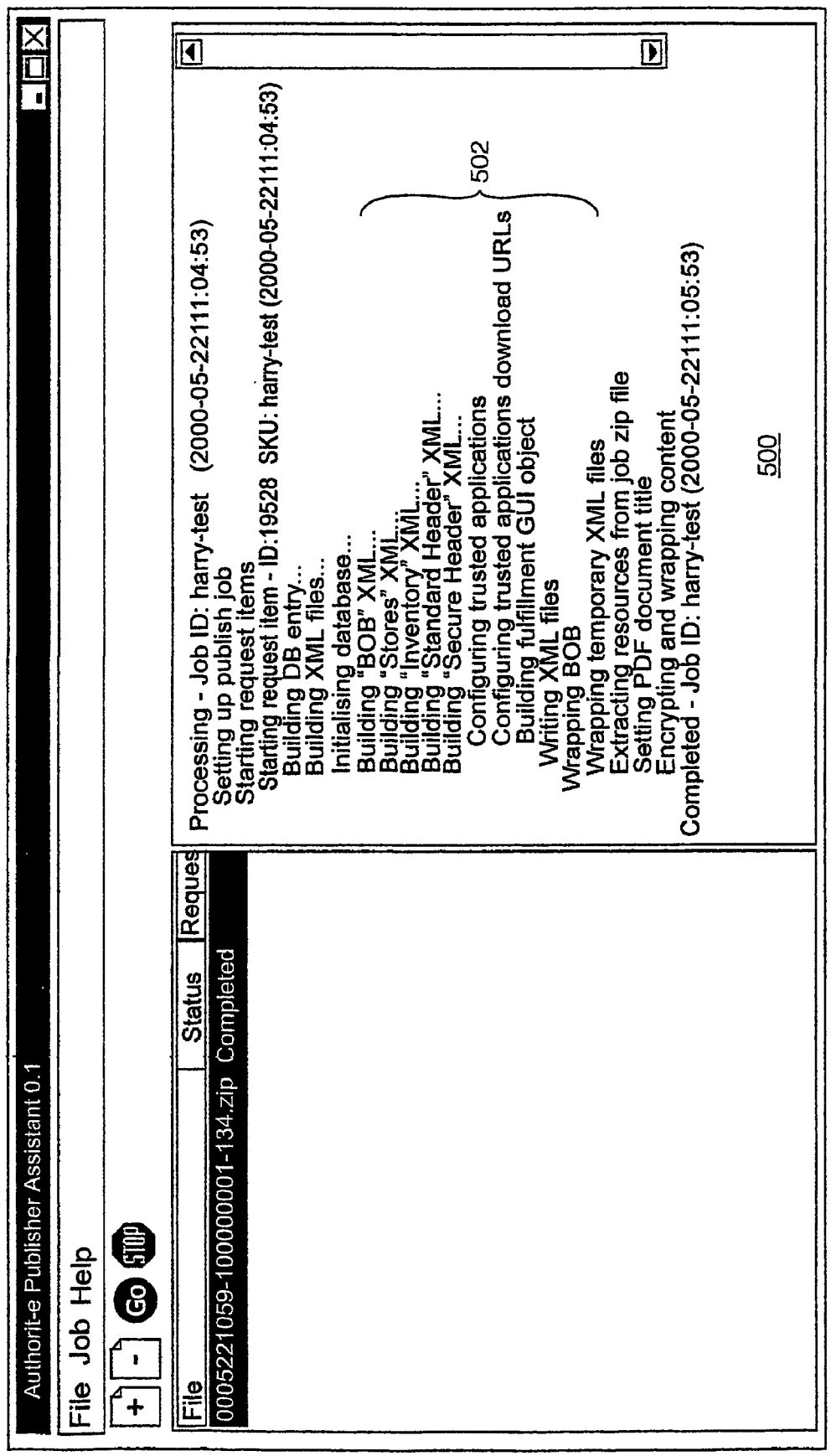
FIG. 5 illustrates a screen capture 500 of the publisher's server that shows the job request file status as completed.
Figures 1, 5A:
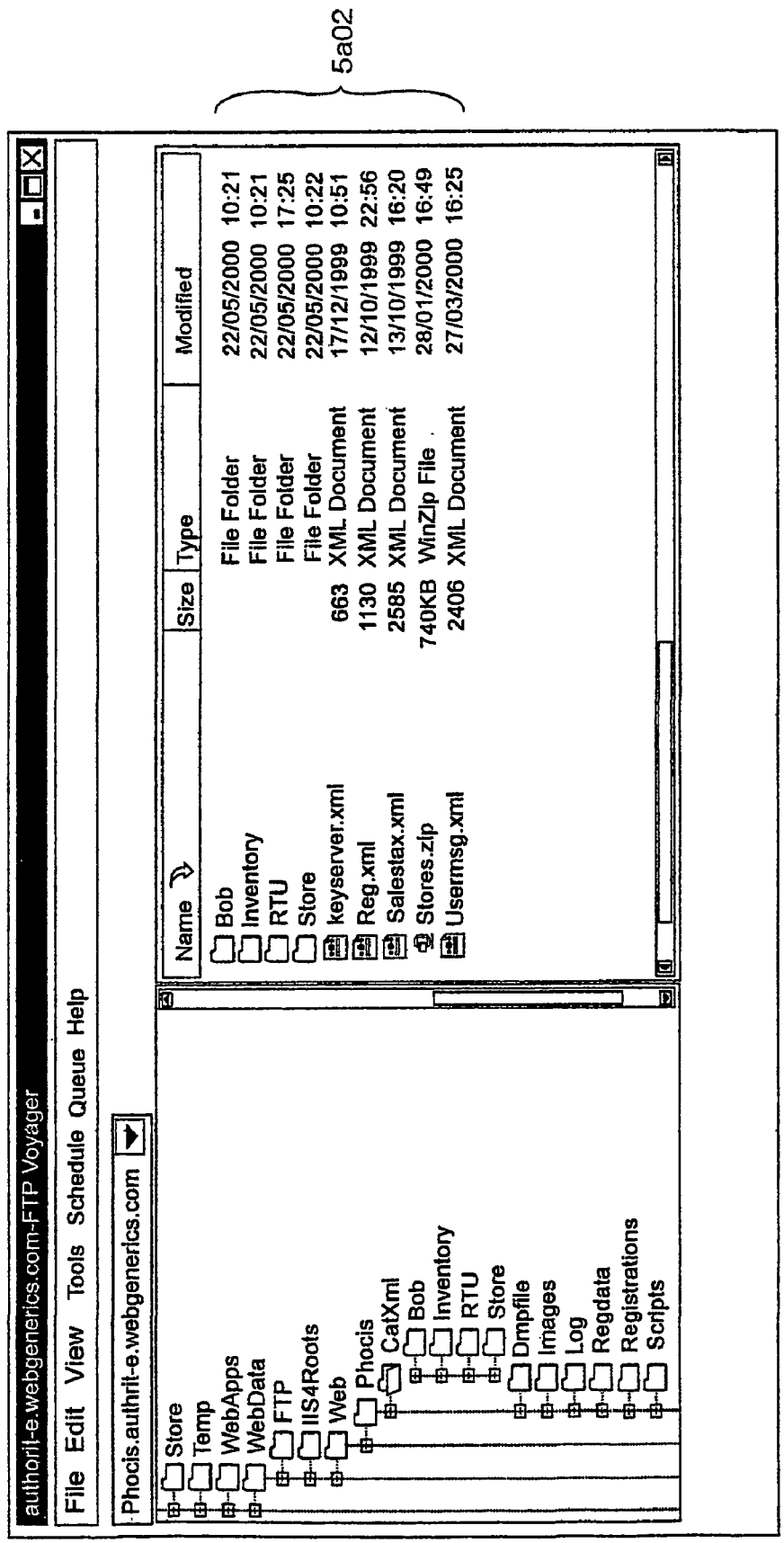
FIG. 1 illustrates schematically a digital rights management system according to an embodiment of the present invention.
FIG. 5a illustrates the folders and XML files that are produced by the publisher's server while processing a job request file.
Figures 2, 5A:
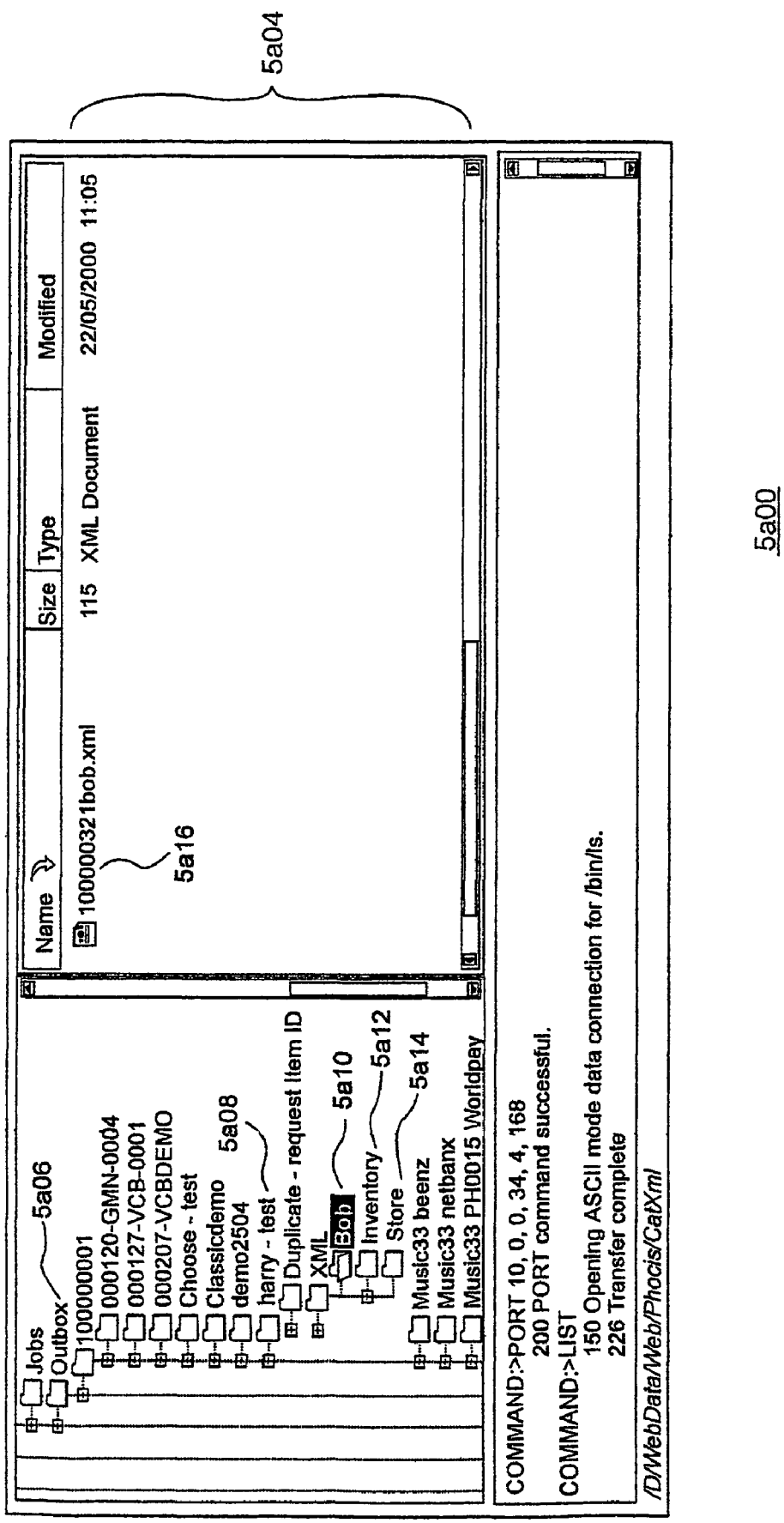

Referring to FIG. 1 there is shown a digital rights management system 100 according to an embodiment of the present invention. The digital rights management system 100 comprises three main elements; namely, publisher systems 102, a licensing server 104 and a customer or client machine 106 which all communicate via the Internet 108.

The publisher system 102 produces a secure or wrapped content file 110 which contains, amongst other things, encrypted digital content which a publisher wishes to make available via the Internet 108.

In an embodiment of the present invention, the publisher system 102 is arranged to combine at least three distinct elements to produce the wrapped content file 110. The first element is the digital content 112 that the publisher wishes to publish. The digital content is a digital file that can be read or utilised by a corresponding application. For example, the digital content may be an MP3 file or a PDF file. However, the embodiments of the present invention are not limited to the above types of digital content file. It will be appreciated that embodiments can be realised in which the digital content file represents any digital media. A second element that is used to produce the wrapped content file 110 is the electronic wrapper file 114 that contains an electronic. wrapper for the wrapped content file 110. The electronic wrapper is used at the client machine 106 to provide a publicly accessible and displayable image upon invocation of the wrapped content file 110 by a prospective purchaser (not shown). For example, the electronic wrapper may be an image which corresponds to or which represents the equivalent of the cover of a CD. A graphical user interface (GUI) definition file 116 is used to define the graphical user interface that is output at the client machine upon initial invocation of the wrapped content file 110 and during the licensing process. The graphical user interface definition file controls the manner in which a user can interact with the wrapped content file to gain access to the encrypted digital content. Optionally, the GUI definition file contains an initial set of conditions subject to which the digital content can be licensed automatically by the client machine using the plug-in 122 without referring to licensing server 104. Advantageously, this facility permits, for example, automatic trials or previews of the digital content. It should be noted that embedded XML is required to implement such a trial feature. Should the prospective purchaser require authorisation to deal with the digital content beyond the initially prescribed terms and conditions, the XML contains an appropriate reference to the licensing server which will lead the prospective purchaser through a suitable licensing process thereby changing the licensing conditions or the licensed state of the digital content at the client machine.

The publisher system 102 combines, in a manner described hereafter, the digital content file 112, the electronic wrapper file 114 and the GUI definition file 116 to produce the wrapped content file 110. The wrapped content file 110 can be made available to prospective purchasers via various on-line means such as posting at a merchant's web-site or at the publisher's web-site or via some other means of electronic distribution such as, for example, which may be particularly applicable in the case of demonstration or promotional material, via e-mail and automatically licensed for a limited period of time.

It will be appreciated that the publisher can distribute the digital content via any medium capable of carrying digital content. For example, the digital content could be distributed via a CD-ROM, DVD or other storage medium. Advantageously, the storage medium may also carry the necessary software for execution at the client machine to instigate the licensing process and afford, ultimately, access to the digital content.

A user instigates access to the secure digital content by invoking of the wrapped content file 110 in the conventional manner such as, for example, by selection using a mouse and pointer via an appropriate application which has an association with the wrapped content file 110. Such an application is, in preferred embodiments, the Adobe Acrobat reader 120 having an appropriate plug-in 122 which is described in further detail hereafter.

Figure 5B:
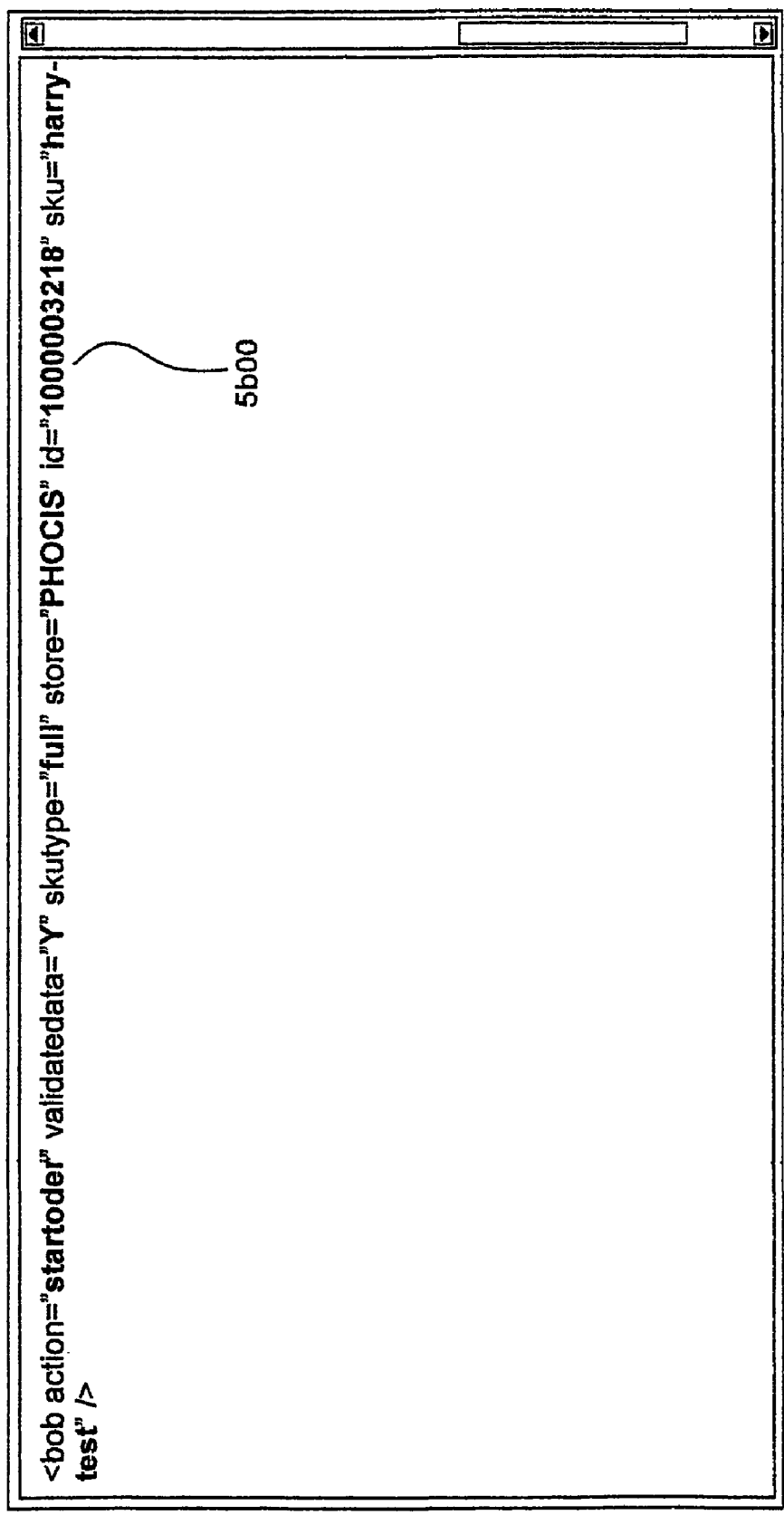
FIG. 5b a BOB XML file which defines the entry point to a catalog held on the licensing server.
Figure 9:
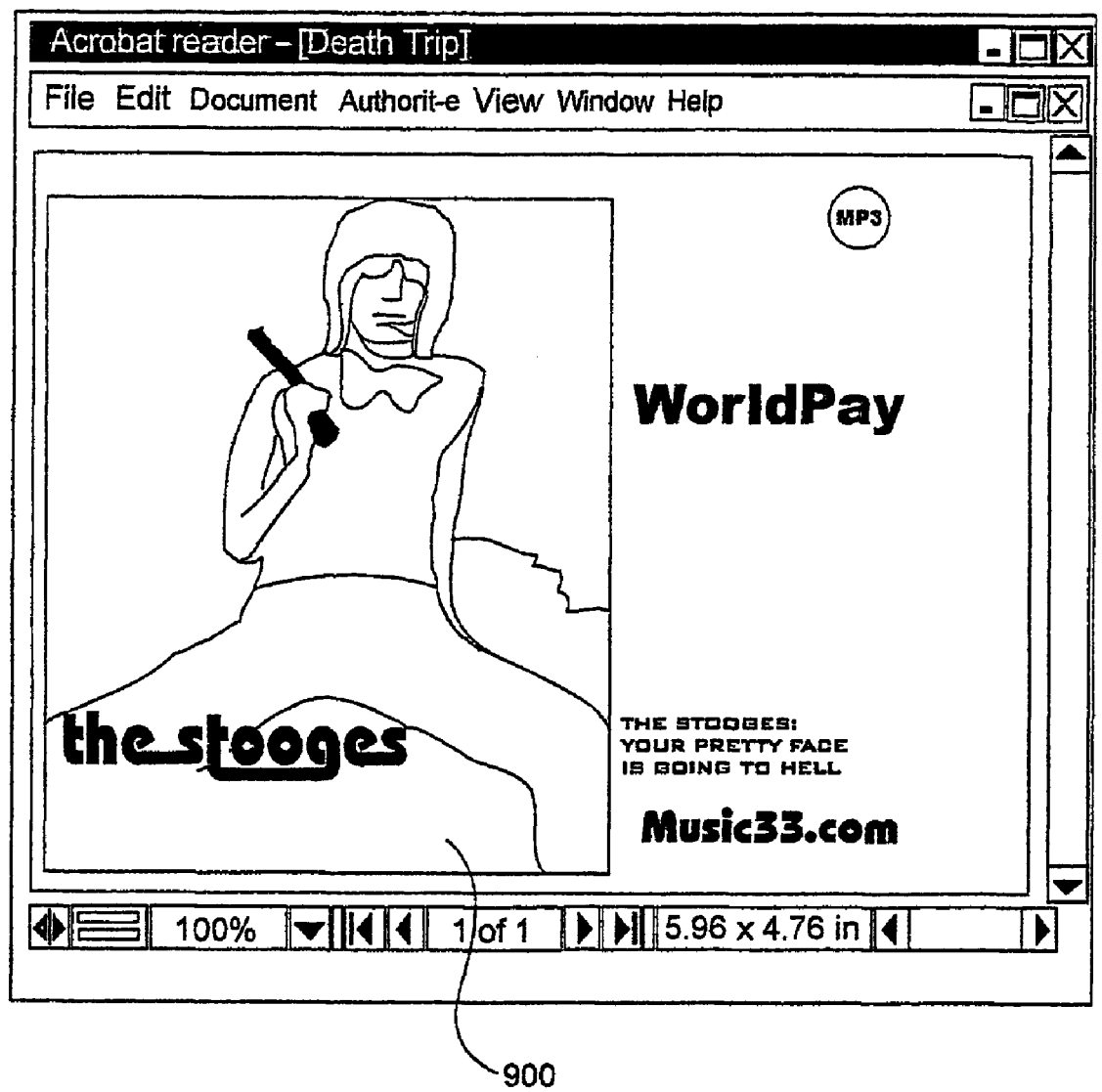
FIG. 9 depicts an electronic wrapper or cover.
Figure 11:
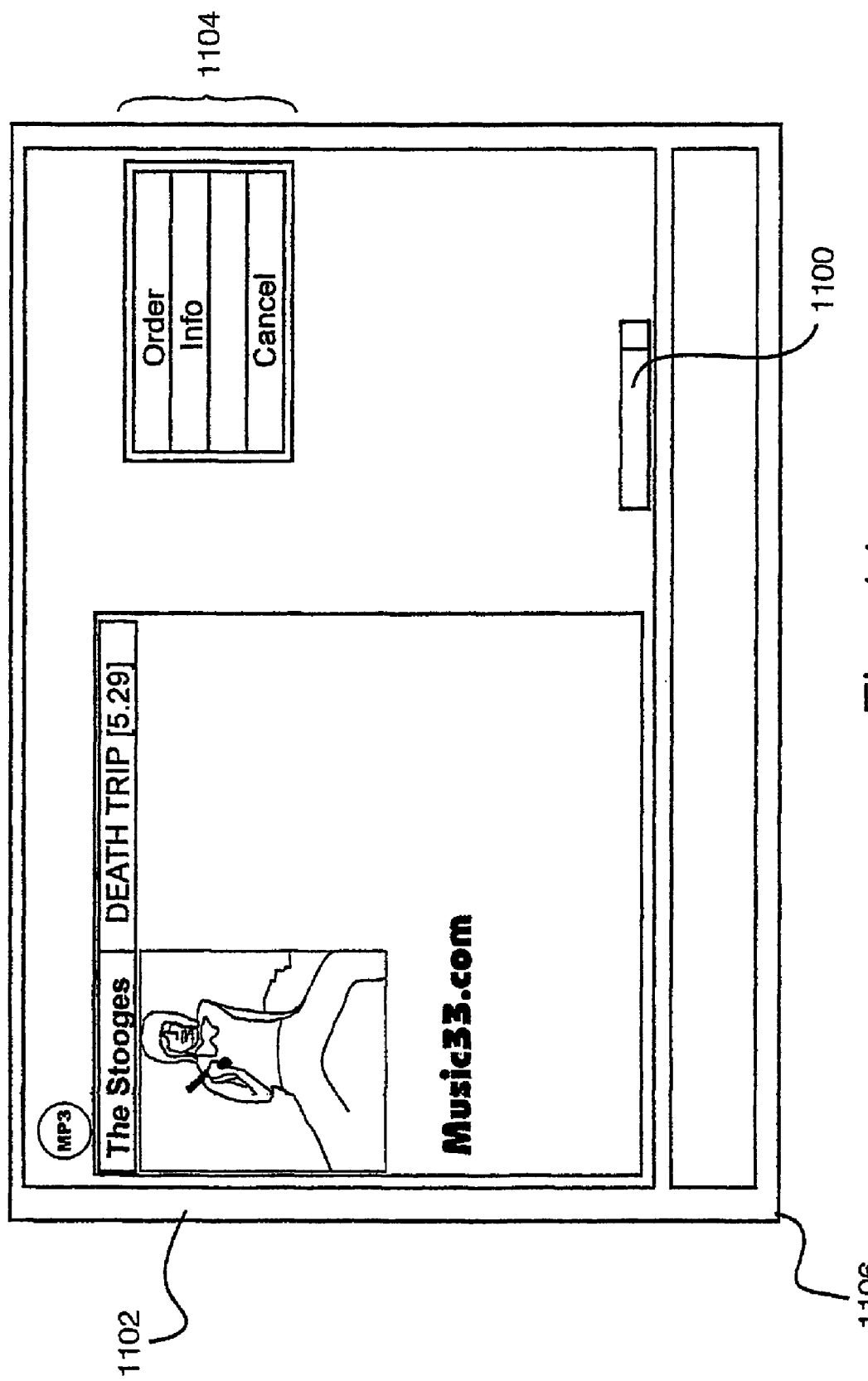
FIG. 11 illustrates a screen capture which offers a potential purchaser an opportunity to purchase a product.

Upon invocation of the wrapped content file 110, the Adobe Acrobat reader 120 is launched and the plug-in 122 is arranged to render the electronic wrapper using the electronic wrapper file 114 and to produce an intended GUI using the GUI definition file 116. An example of an electronic wrapper is shown in FIG. 9 and an example of a GUI skin is shown in FIG. 11. The plug-in 122 is also arranged to access, via an appropriate reference contained within the wrapped content file 110, the remote licensing server 104. The licensing server 104 comprises a data base of XML that are used to provide access to corresponding secure, wrapped content files 110. The Inventory XML and Stores XML files, in combination, describe how the state of a license can be changed from one state to another. The licensing server delivers the licensing process, as described in the STORES XML, to the client using the defined process XML, that is, startorder, confirmorder, etc., in the appropriate order. The reference within the wrapped content file 110 to the licensing server 104 also comprises an identifier to allow the corresponding XML license rules file 118 to be identified, retrieved and transferred to the client machine 106 to control or influence the licensing process, that is, to control or influence the grant of rights to use the digital content. The identifier is obtained from a further XML file, BOB XML file, described hereafter with reference to FIG. 5b. Although the license rules file 118 is schematically illustrated as being a single entity, it comprises the BOB, STORES, INVENTORY and RTU XML files.

The XML license rules file 118 which correspond to the invoked wrapped secure content file 110 are retrieved from an XML license rules file database 124 and transmitted via a secure link for use in the plug-in 122. The XML license rules file 118 controls the licensing process a potential customer must undertake before access is granted to the encrypted or secure digital content.

It will be appreciated that embodiments of the present invention have a significant advantage over prior art systems which generally encrypt and embed the licensing terms and conditions within wrapped digital content files. The use of such embedded licensing terms and conditions is very inflexible and any given stock of wrapped content can readily become out of date as soon as a publisher's preferred licensing terms and conditions change. To address this problem, the prior art would have to withdraw the existing wrapped content files, re-wrap the digital content with a new terms and conditions and then make that re-wrapped content available to prospective purchasers. In contrast, however, the present invention to effect a change in a publisher's preferred licensing terms and conditions merely has to change the corresponding XML license rules file 118 that is stored at the licensing server 104. It can be appreciated that effect is given to a global change in licensing terms and conditions for corresponding wrapped content merely by changing the XML license rules file 118 stored within the license management data warehouse 124 database at the remote licensing server 104. Such flexibility is beneficial in, for example, the situation where a merchant has decided to offer or make a promotional offer of digital content free of charge for a fixed trial period when that content was previously available only in exchange for a suitable payment. No further changes are required to be made to the wrapped content file 110. Furthermore, the process of having to re-wrap the digital content is avoided.

Once a potential purchaser has undertaken all of the licensing steps prescribed by the XML license rules files 118, authorisation data is transmitted from the licensing server 104 to the plug-in 122 which grants access to the digital content. However, it should be noted that the access does not take the form of rendering the digital content separately identifiable and capable of independent manipulation. The access granted is limited in the sense that any one of a number of trusted applications can be used to process the decrypted digital content. A trusted application is defined as an application that is capable of processing corresponding or appropriate digital content without making or carrying the risk of making that digital content or without rendering or carrying the risk of rendering the digital content susceptible of manipulation other than by way of invoking the secure wrapped content file 110. For example, if the digital content is an MP3 file, the list of trusted applications may include, for example, the Destiny media player, version 1.30. The Destiny media player, version 1.30, merely plays the MP3 file and does not make the decrypted or insecure MP3 file available for further manipulation. Clearly, the present invention advantageously overcomes the problem of prior art systems which decrypt the digital content and render that decrypted digital content capable of separate manipulation.

Figure 2:
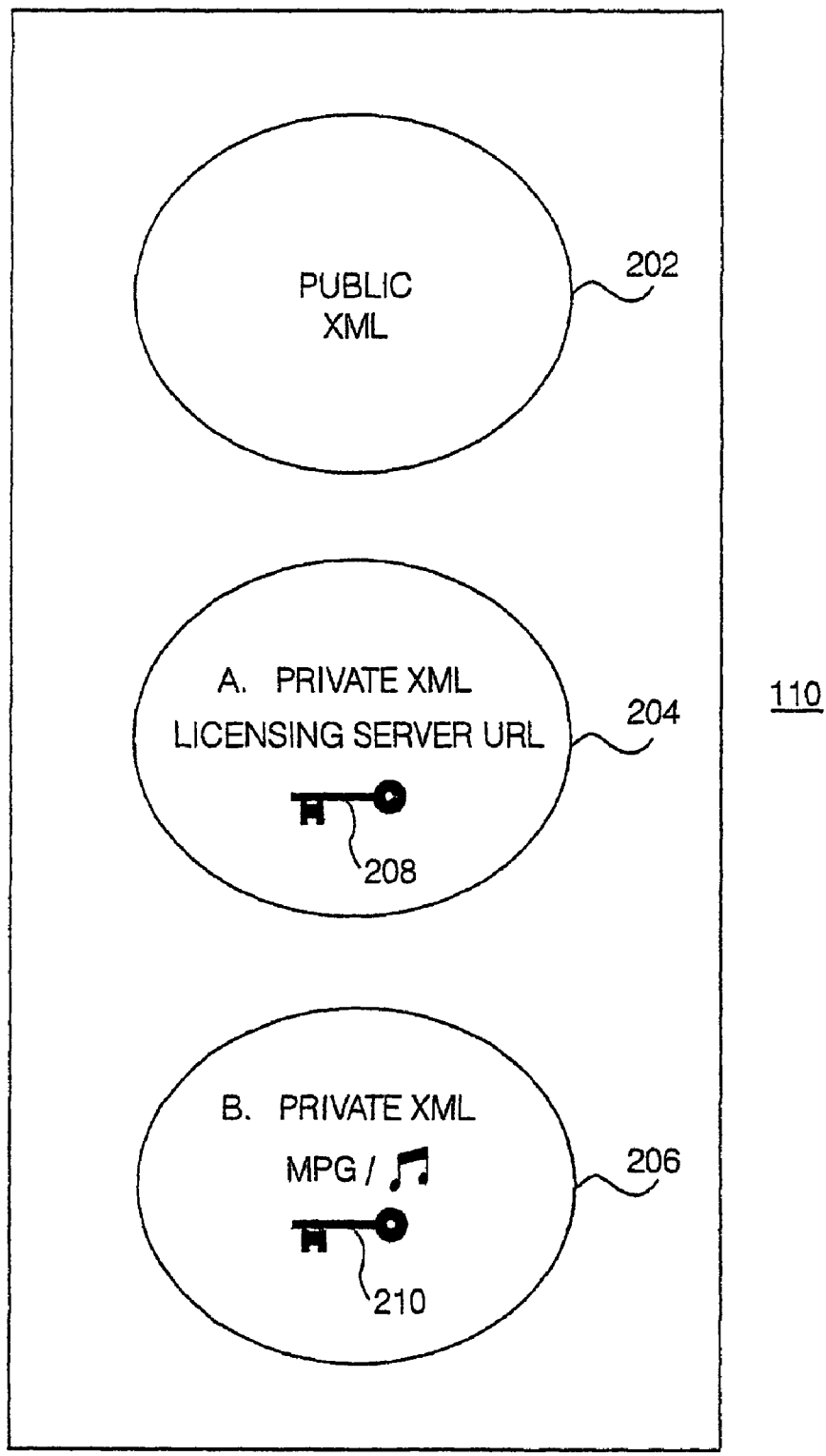
FIG. 2 illustrates schematically the basic structure of a secure wrapped content file that is distributed or published by a content publisher.

Referring to FIG. 2 there is schematically shown the structure of a secure wrapped digital content file 110. The file, in an embodiment, is a PDF file. However, those skilled in the art appreciate that the file could equally well be another format, for example, an XML object. The PDF file 110 comprises three data objects 202, 204 and 206. The first object 202 is a public XML object which is unencrypted XML data that describes the version number of the digital rights management system that must be used to read the file or that was used to create the file. The second object 204 is a private XML object that has been encrypted using a corresponding first encryption key 208. The second object 204 comprises metadata that describes the PDF file, an initial GUI and branding data, a reference or pointer to the licensing server 104 and a list of trusted applications with which the decrypted digital content can be processed.

A third private XML object 206 is also encrypted with a corresponding encryption key 210. The third private XML object contains the encrypted digital content that can be processed by the trusted applications. The digital content may be, for example any digital file such as, for example, an MP3 file or an MPEG or other audio/visual file. Preferably, the private XML objects are encrypted differently. Although the third object has been described in the embodiments as an XML object, it will be appreciated that the present invention is not limited thereto and that private objects other than XML private objects could equally well be used.

Figure 3:
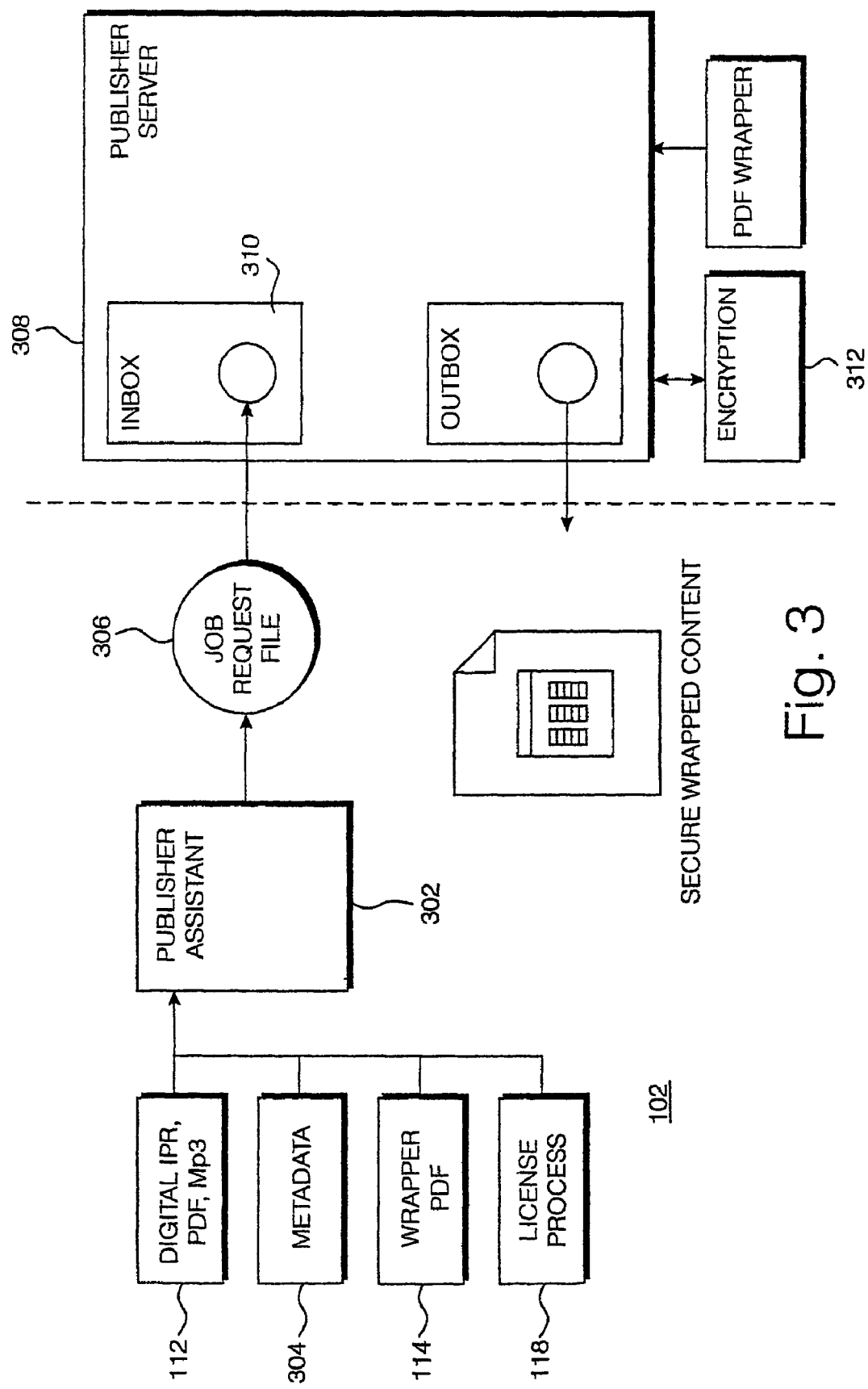
FIG. 3 schematically shows, in greater detail, a publishing system according to an embodiment of the present invention.

Referring to FIG. 3 there is shown a publisher system 102 according to an embodiment of the present invention. The publisher system 102 is used to create a wrapped content file 110 using a corresponding digital content file 112, an electronic wrapper file 114, a GUI definition file 116 and an XML license rules file 118. The publisher system 102 comprises two main parts; namely, a publisher assistant and a publisher server.

The publisher assistant creates a publication request file which is a single zipped file comprising the appropriate digital resources, such as the digital content file 112, the electronic wrapper file 114, the GUI definition file 116 and the XML license rules file 118, to allow the wrapped file to be produced.

The publisher server performs the wrapping process, creates the protected content, that is, it creates the secure wrapped content file 110, and produces associated XML configuration files for use by the remote licensing server 104. In broad terms, the publisher server comprises an in-box which is monitored for the presence of job requests. Upon detection of a job request, the wrapping process is performed which results in the placement in a corresponding out-box of the secure wrapped content file 110 and the configuration XML files at a predetermined storage location for transmission to the remote server. The publisher server also comprises an Acrobat plug-in utility that is designed to embed the secure wrapped content file 110 within an Acrobat PDF wrapper. A further utility, PDFSet, that is also an Acrobat plug-in utility, is used to set the title of the Acrobat wrapper file. It will be appreciated that while the embodiments have been described with reference to a PDF utility, the present invention is not limited thereto and such utilities are merely examples that are specific to PDF file formats. Other utilities may be used to set or establish corresponding features of different file formats. For example, the outer wrapper may be an XML file or a Flash file.

It can be seen from FIG. 3 that the publisher assistant 302 processes four sets or groups of files to produce a job request file 306. The four files that are processed by the publisher assistant 302 include the digital content file 112, the electronic wrapper file 114 and the XML license rules file 118 and an additional metadata file 304. The metadata 304 is shown in FIG. 3c at 3c04 and will be described in greater detail hereafter. The metadata includes, in a preferred embodiment, data such as a corresponding identifier to identifier the job request file, a part number, a title for the secure wrapped content file, an indication of the publisher, together with various other optional data which change according to the type of digital content. For example, if the digital content is an MP3 file, the metadata would also include data relating to the artist or artists, the author of the song, an indication of the location within the publisher's server 102 of the corresponding MP3 file, a similar indication for the location within the publisher server 102 of the corresponding PDF wrapper file, an indication of the intended or actual publication date, an indication of the location and identity of a skin outer and an indication and the skin HTML, which both form a part of the electronic wrapper. It will be appreciated that the metadata will change according to the type of the digital content (MIME type), that is, the metadata can be changed or determined on a MIME-type by MIME-type basis, and according to publisher requirements. For example, if the digital content is an e-book, the metadata will contain data identifying the author or writer whereas if the digital content is a song, the metadata comprises data identifying the composer. It can be appreciated that the metadata collated for a given digital content varies according to the MIME-type appropriate to that digital content.

In an embodiment the job request file 306 is a ZIP file which contains an XML job ticket and all resources required to produce a secure wrapped content file 110.

Figure 3A:
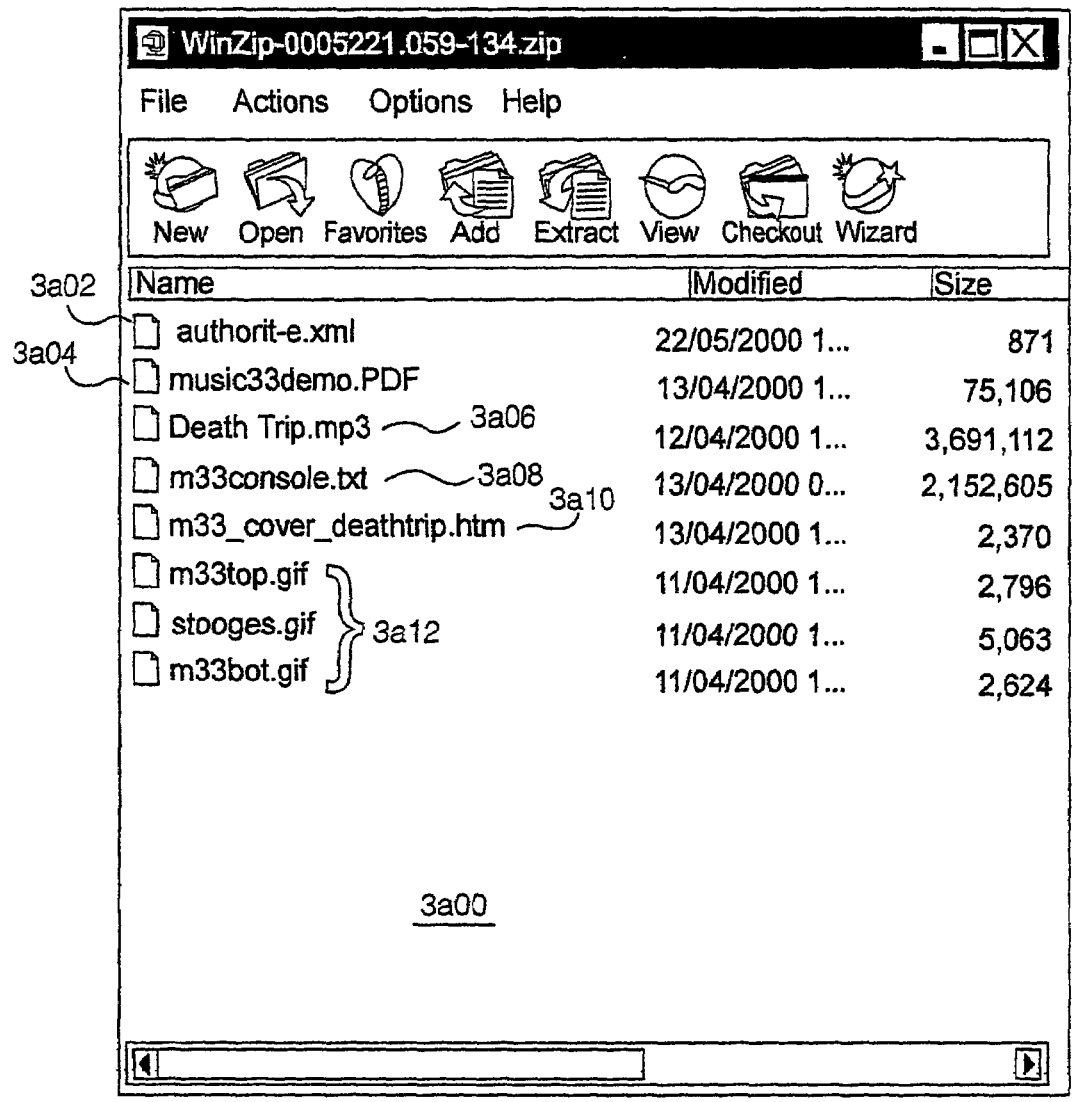
FIG. 3*a* illustrates a screen capture 3*a*00 of the output of the Win Zip application.
Figure 3C:
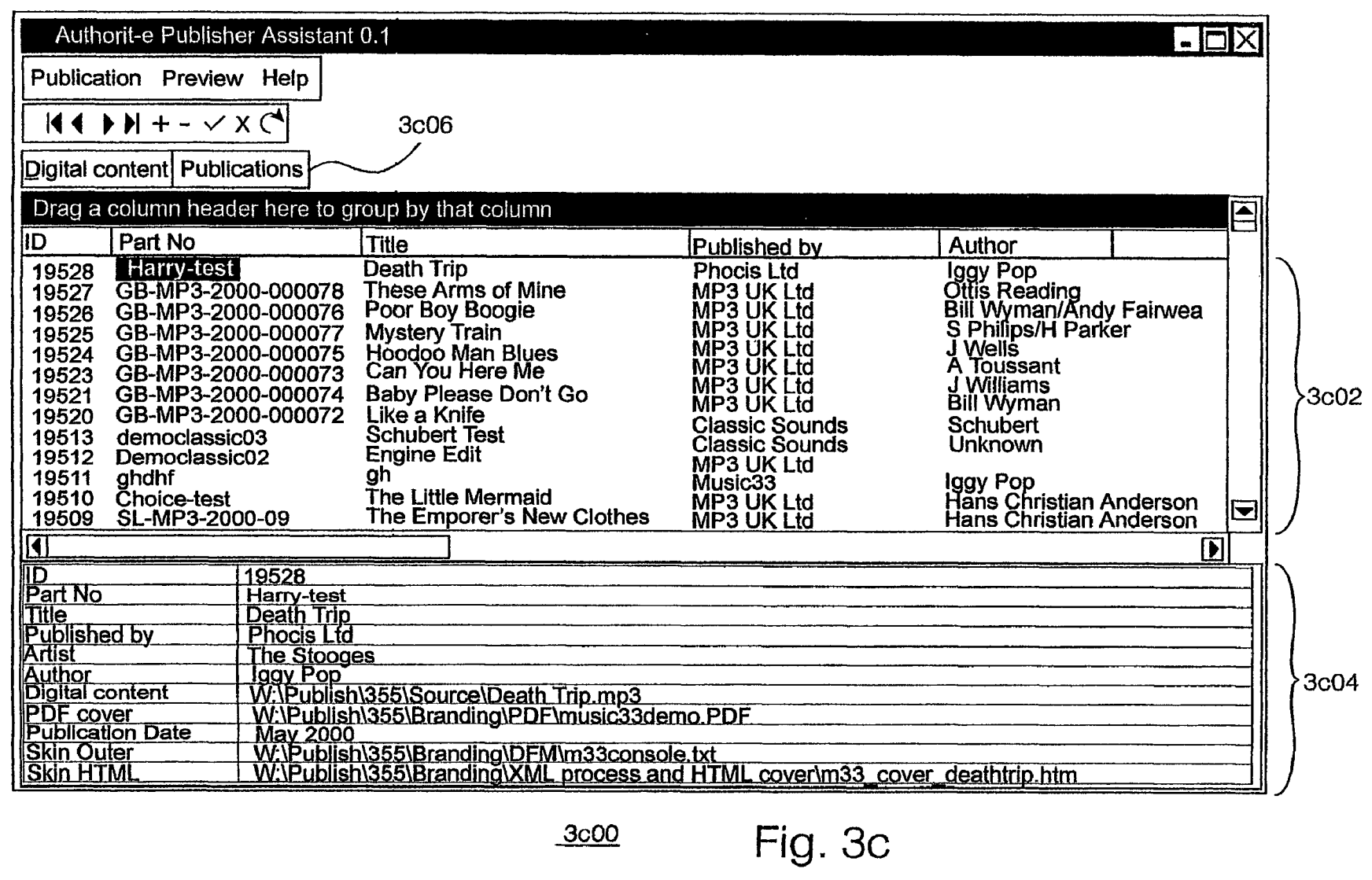
Figure 3D:
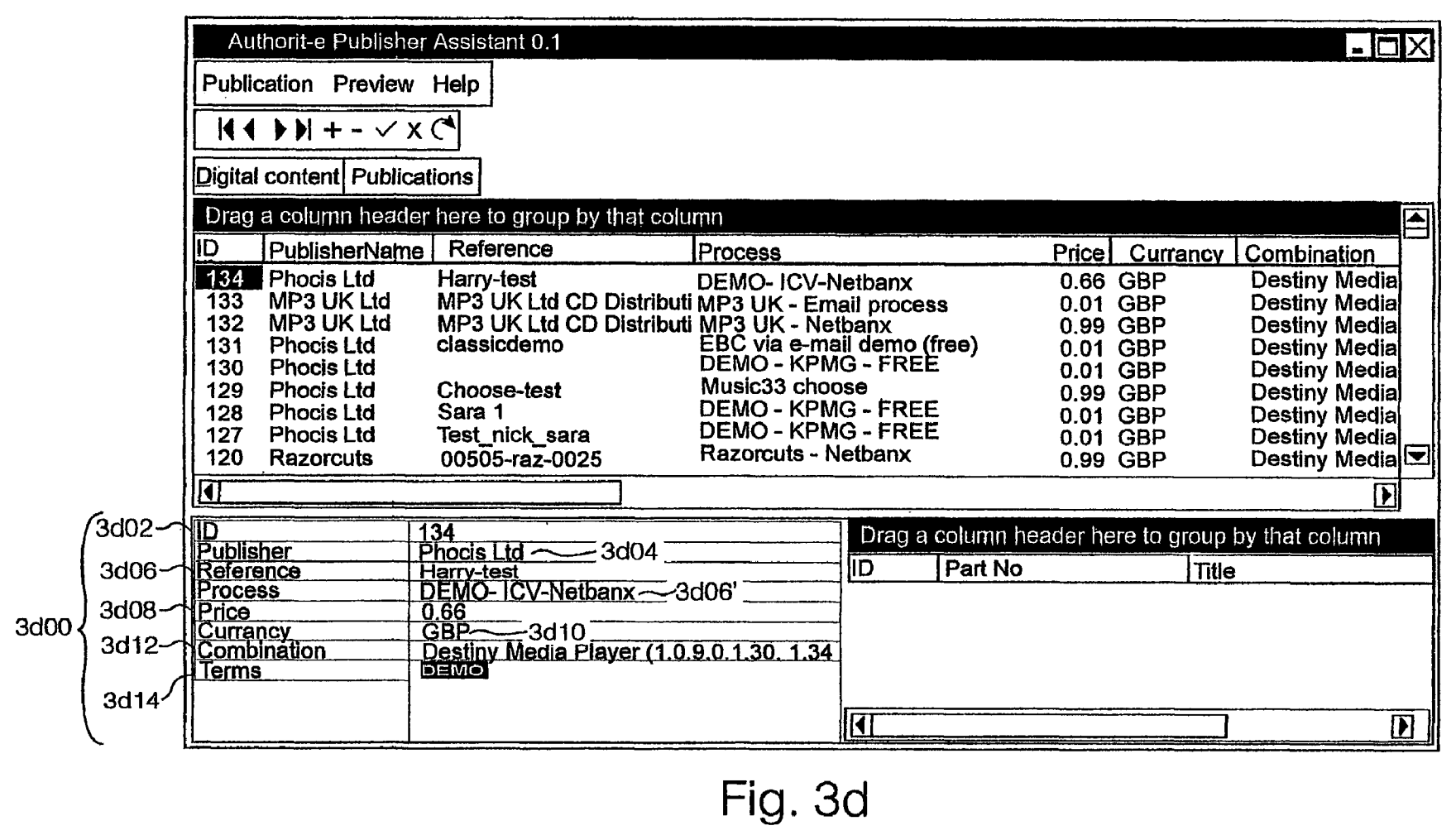

FIG. 3a illustrates a screen capture 3a00 of the output of the WinZip application available from Nico Mak Computing, Inc. FIG. 3b provides an illustration of an embodiment of a XML job ticket that is processed by the publisher server 308 shown in FIG. 3. Referring again to FIG. 3a it can be seen that the WinZip screen capture shows the XML job ticket 3a02, an electronic wrapper or cover in the form of a PDF file 3a04, an MP3 file entitled Death Trip.MP3 3a06, a text file, m33 console.txt, 3a08 which contains text that can be rendered at a client machine. The text may include, for example, song lyrics or details about the author or artist of the song. The WinZip screen capture 3a00 also illustrates the electronic equivalent of a CD cover, that is, mp3_cover_death trip.htm 3a10 and several gifs 3a12 which are rendered into the html.

Referring to FIG. 3b the format of an XML job ticket or job request file is shown. The tag <adrml-publication-request> contains data that identifies the wrapping job to be performed. The tag <request-items> identifies the materials or resources that are intended to be wrapped by the publisher server 308. Of particular interest is the tag <fulfilment process.ID="2"/>. The value of this data variable identifies a corresponding licensing process that a prospective purchaser must undergo before access is granted to the digital content. Embodiments of possible licensing processes are described hereafter with reference to FIGS. 11 to 16.

A further tag entitled <trusted.applications applications.id ="17"/> is used to identify a number of applications with which the secure digital content can be processed. In the embodiments shown, the tag <trusted.applications applications.id> has a value of 17. The tag <terms term.id> is used to identify the specific licensing conditions subject to which the publisher of the digital content is prepared to license the digital content, including an initial set of conditions subject to which the digital content can be automatically licensed by the client machine 106 without reference to the licensing server 104.

Still referring to FIG. 3, the publisher server 308 constantly monitors the in-box for the presence of a job request file 306. Upon detecting a job request file 306 the publisher server notes the presence of a job request file 306 and puts that job request file in a queue for processing in due course.

Figure 3E:
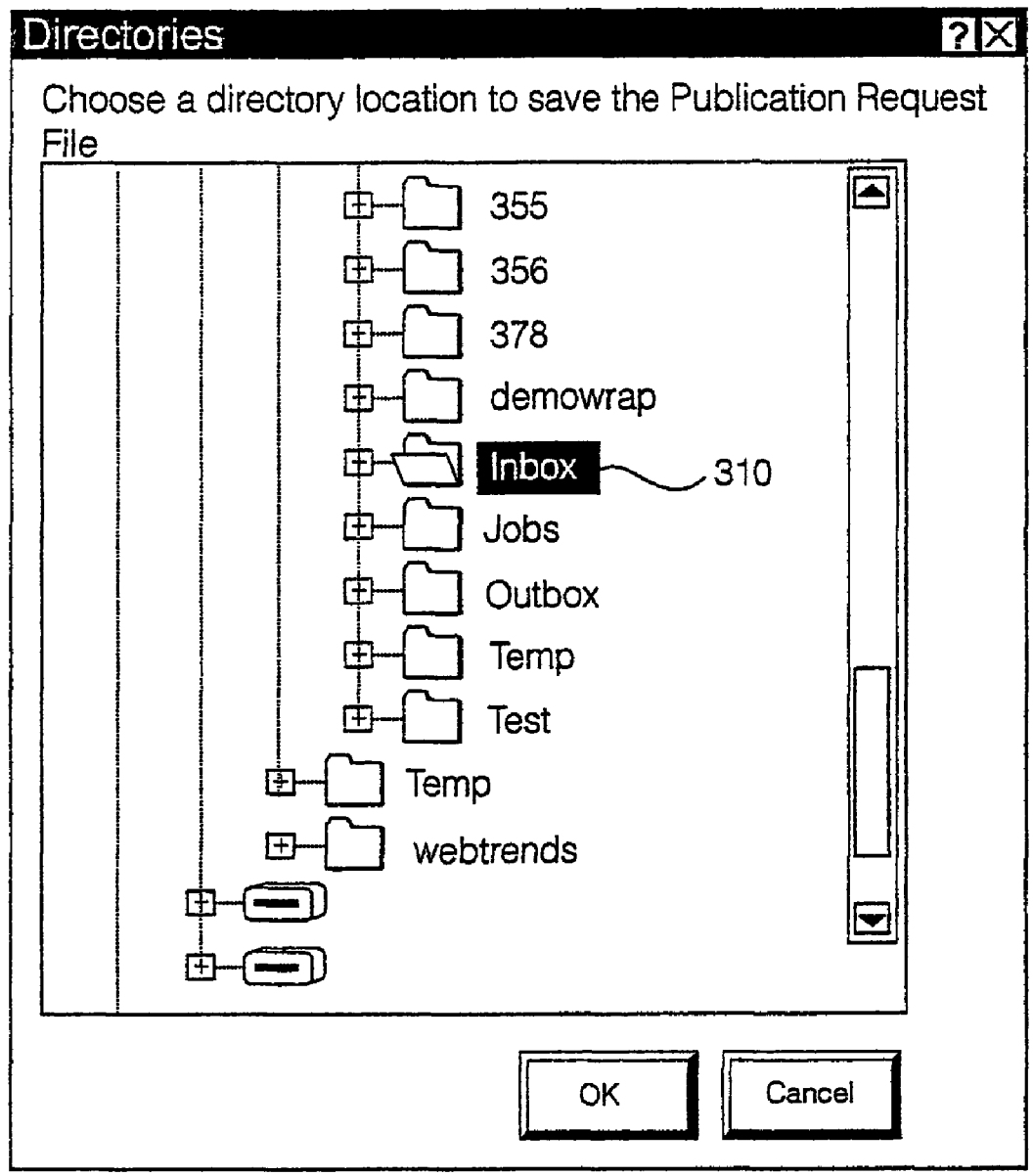
FIG. 3*e* shows a Publisher system in-box.

Referring to FIG. 3c there is shown a content definition screen capture 3c00 which shows a number of collections of the data 3c02 that are stored in respective directories and proposed to form respective secure wrapped digital content files 110. In the illustrated embodiment the part number "harry-test" has been selected. The metadata associated with harry-test is shown at 3c04. The metadata 3c04 will form part of the metadata file 304. Once the digital content, metadata and branding, that is, PDF, GUI skin and HTML, have been collated the tab 3c06 entitled "Publications" is selected. This tab 3c06 is used to relate the publisher and publication date, the licensing process, the pricing, the trusted players and the license terms and conditions to the digital content that is proposed to be published. In a preferred embodiment, the license terms and conditions can be used to establish initial conditions under which access to the digital content is granted without reference to the licensing server. Such initial access conditions may include, for example, automatic trial periods/preview, embargo dates, expiry dates, number of permissible prints etc. It can be seen from a first section 3d00 that the publication of the MP3 file death trip has been given an identification number of 134 3d02, the intended publisher is Phocis Limited 3dj04, the reference is harry-test 3d06 the licensing process, which is one process selected from a number of possible processes is indicated as being DMNO-ICV-NetBanx. This identifies NetBanx as the appropriate e-commerce provider and will associate the corresponding RTU XML file with this content to be published. The price to be paid for listening to the MP3 file death trip is, in the present example, 66p as can be seen at 3d08. The currency of the transaction is indicated as being sterling as can be seen from 3d 10. The field combination 3d12 this is a number of applications that are trusted, that is, that have been approved for use within the DRM system to play the digital content. The trusted players for any published digital content can be established or edited as the publisher see fit. The field Terms 3d14 identifies the conditions to be imposed by the publisher in relation to the usage of the corresponding MP3 file. The sample licensing terms are described hereafter. Once the publisher, licensing process, pricing, trusted players and licensing terms and conditions have been established the details together with the resources collated and shown in FIG. 3c are bundled into a job request file 306 that is placed in the in-box 310 of the publisher's server as shown in FIG. 3e. In the illustrative embodiment, the job request file (FIG. 3a) comprises a ZIP file containing the resources required to product the wrapped content file or files, together with a job ticket (FIG. 3b) that describes the wrap job to be performed by the publishing server.

Figure 4:
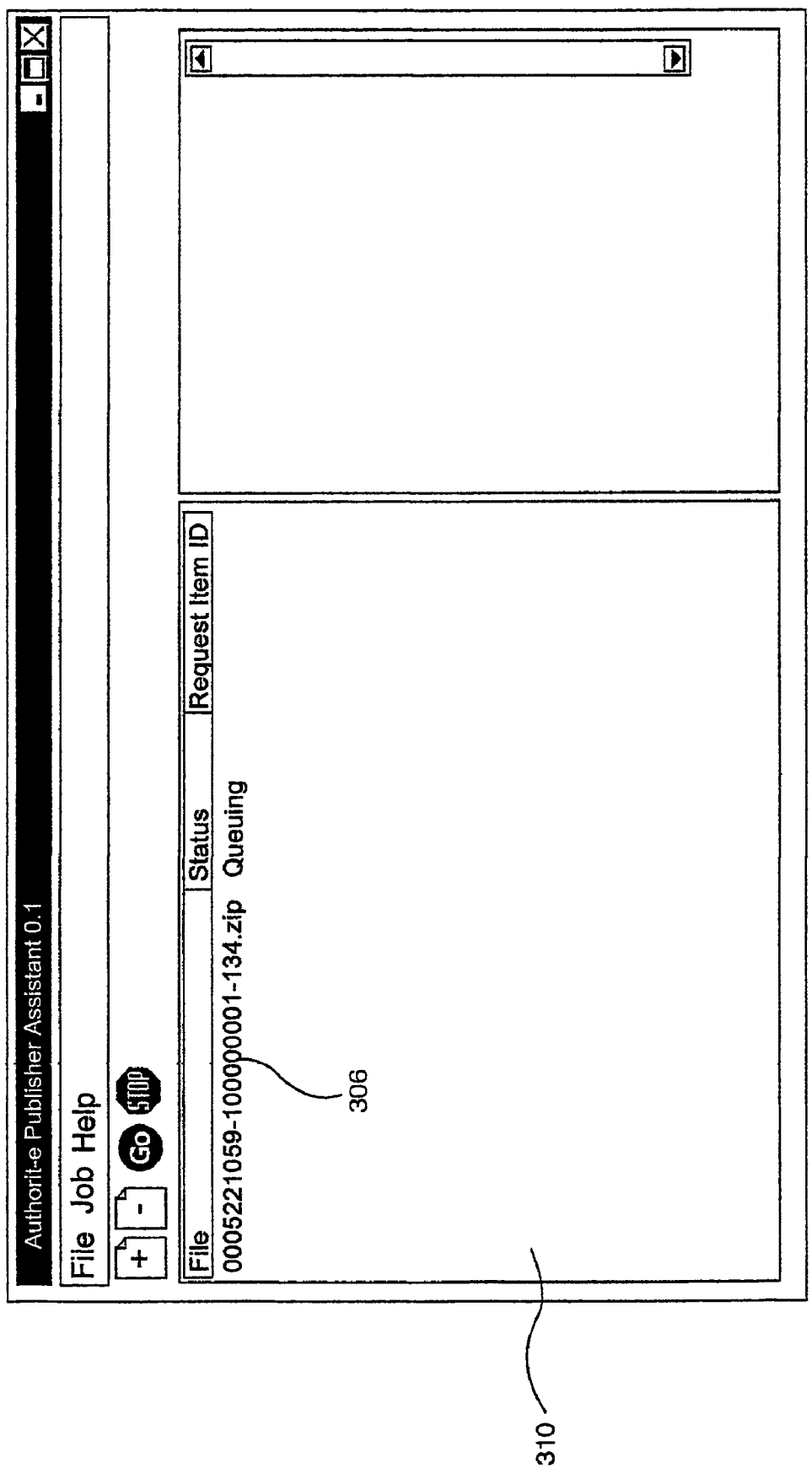
FIG. 4 shows a screen capture of the publisher server, showing the job request file queued in the publisher server in-box.

FIG. 4 shows a screen capture 400 of the publisher server 308 which shows a job request 306 in the in-box 310 of the publisher server 308.

FIG. 5 illustrates a screen capture 500 of the publisher server that shows the job request file status as completed. The right-hand side of the screen capture shows the processing steps that are performed by the publishing server 308 to produce a secure wrapped content file 110. It can be seen that the processing steps include a step of "Encrypting and wrapping content". In a preferred embodiment, the encryption is performed using third party encryption technology 312 as can be seen from FIG. 3. Preferably, the encryption technology utilised by the publisher server is independent of the process of the wrapping process performed by the publishing server 308. A preferred embodiment of the present invention currently utilises ç-Dilla encryption technology, namely Safecast available from ç-Dilla Labs, Woodley House, Crockhamwell Road, Woodley, Reading, Berkshire RG5 3JP, UK.

It can be appreciated from FIG. 5 that the publisher server 308 produces a number of XML files 502 that are used by the plug-in 122 and the remote licensing server 104 to grant access to the wrapped digital content. Each of the XML files as described hereafter with reference to FIG. 5a to 5e.

Referring to FIG. 5a there is shown a screen capture 5a00 which illustrates the folders and XML files 5a02 that are produced by the publisher server 308 while processing a job request file 306. The folders and XML files 5a02 constitute an XML catalogue that is transferred to the licensing server 104 for use in granting access to the secure digital content in response to a request from a prospective purchaser. The lower half of the screen capture 5a04 shows the content of an out box 5a06 which contains a significant number of secure wrapped content files. One such file has been partially expanded and is entitled harry-test 5a08. The file entitled harry-test 5a08 also comprises a XML directory which has three folders, that is, a bob folder 5a10, an inventory folder 5a12 and a stores folder 5a14 which all correspond to the appropriate folders of the XML catalogue shown in the folders and files section 5a02. In the embodiment shown, the bob folder 5a10 contains an XML document entitled, 1000003218bob.xml 5a16 which represents an XML catalogue entry point. The bob XML catalogue entry point 5a16 is shown in greater detail in FIG. 5b. It can be seen that the bob XML catalogue entry point comprises six variables that are set to various values to identify uniquely the secure wrapped content file 110. The variables are utilised by the plug-in 122 to identify to the remote licensing server 104 the secure wrapped digital content file for which usage rights may be requested.

It will be appreciated that the variables can be extended to provide further information about the about the requesting BOB to the licensing server. It is the combination of the catalog variables and variables captured from the user that determine the licensing process.

Referring to FIG. 5c, there is shown the stores XML file which defines merchant information, a publisher and a licensing process together with supporting licensing process HTML. In the example shown in FIG. 5a it can be appreciated the merchant is "NETBANX". The process that must be undertaken before permission to use the digital content is granted is defined by the startorderxml, confirmorderxml, acceptxml, rejectxml, expiredxml and errorxml variables. The files which these variables specify deliver the user interface of the licensing process, which is delivered within the GUI skin 3a08 defined during the publishing process. The variable proclistid specifies a generic RTU interface, and the variable rtuprocessid specifies an RTU interface document, such as in, for example, FIGS. 5e and 5f, which defines an interface to a third party e-commerce system. The TRU interface document is supplied to the generic RTU interface, which is responsible for communicating with the third party e-commerce system as defined in the RTU interface document, processing the information received from that third party e-commerce, which is typically an acceptance or rejection of a transaction, and returning an 'accept' or 'reject'. The licensing server then returns the appropriate licensing XML (acceptxml or rejectxml) to the client. It can be appreciated that the currency of any transaction conducted with NetBanx will be in sterling. The product, that is, the wrapped digital content, is identified by a variable called productsku. It can be seen that a number of licensing steps are prescribed by the XML and identified using reference numeral 5c00. Each of these licensing steps will be prescribed in greater detail hereafter with reference to FIGS. 11 to 16.

Referring to FIG. 5d there is shown an embodiment of the Inventory XML that prescribes delivery rules and taxation transformations as well as licensing attributes. The first line of the Inventory XML file 5d00 comprises data relating to the product to be sold which is, in the illustrative example, an MP3 file called "The Stooges:Death Trip". The XML identified by reference numeral 5d02, that is, the keyserver definition defines a mapping between the variables that are inherent to or are used to control the encryption technology 312 and the generic licensing variables that are used and recognised by the plug-in 122. These variables 5d02 are used to grant access to the digital content and to control the usage of that digital content. The variable source.country country.code is used to identify the country of origin of the secure wrapped content file 110, that is, it is used to define the country in which the secure wrapped digital content file 110 has been offered for sale. It can be appreciated that the definition of delivery.country defines those countries by way of a two letter code in which the sale of the secure wrapped digital content file 110 is allowable and also provides an indication of the tax that is payable in respect of any such sale. It can be appreciated that the list of countries 5d04 is extensive. If the remote licensing server 104 determines that the request for usage rights has originated or is in respect of a country that is not listed in the deliver.country definition, the request for the grant of usage rights is refused.

Figures 1, 5E:
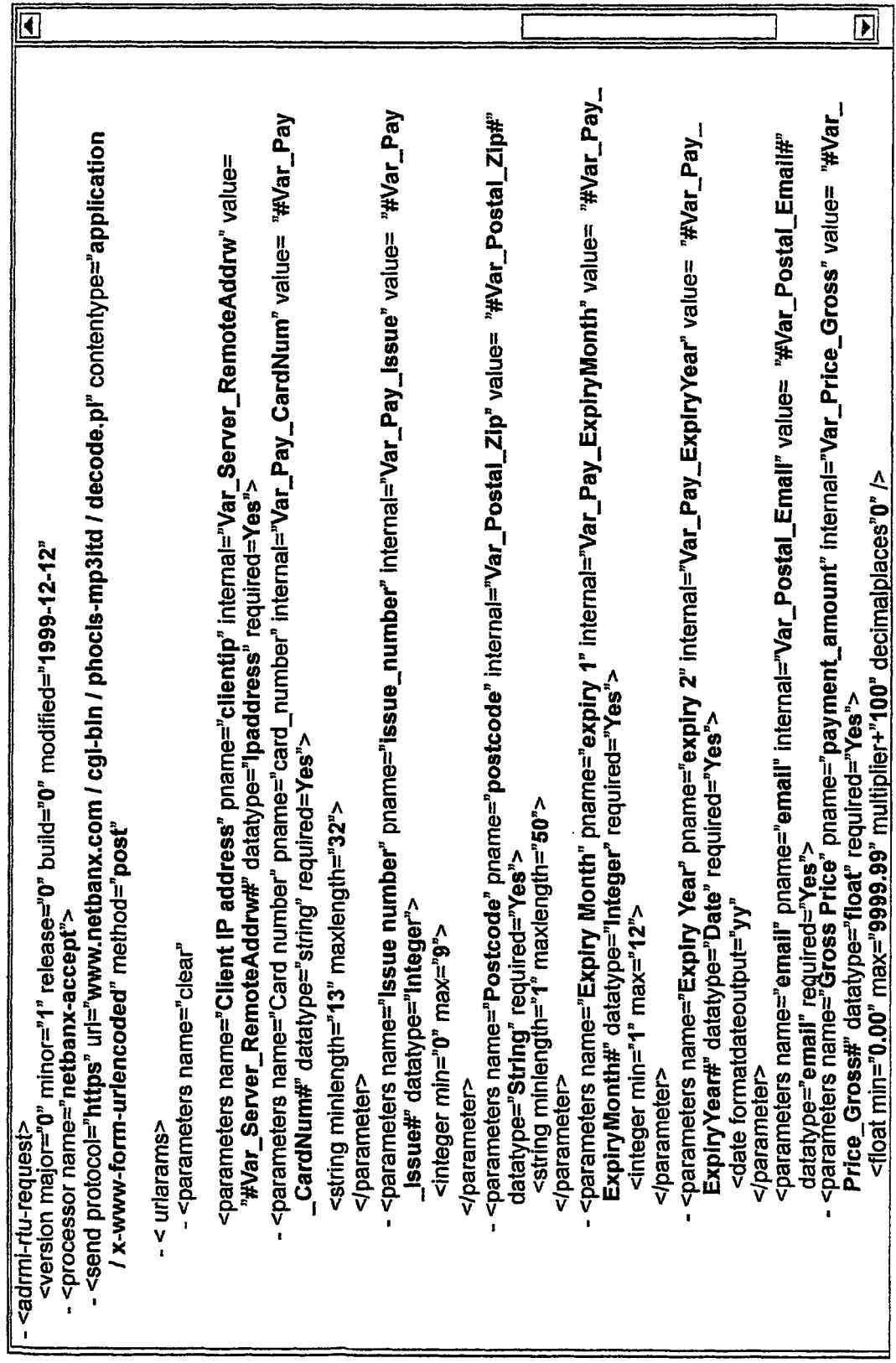
Figures 2, 5E:
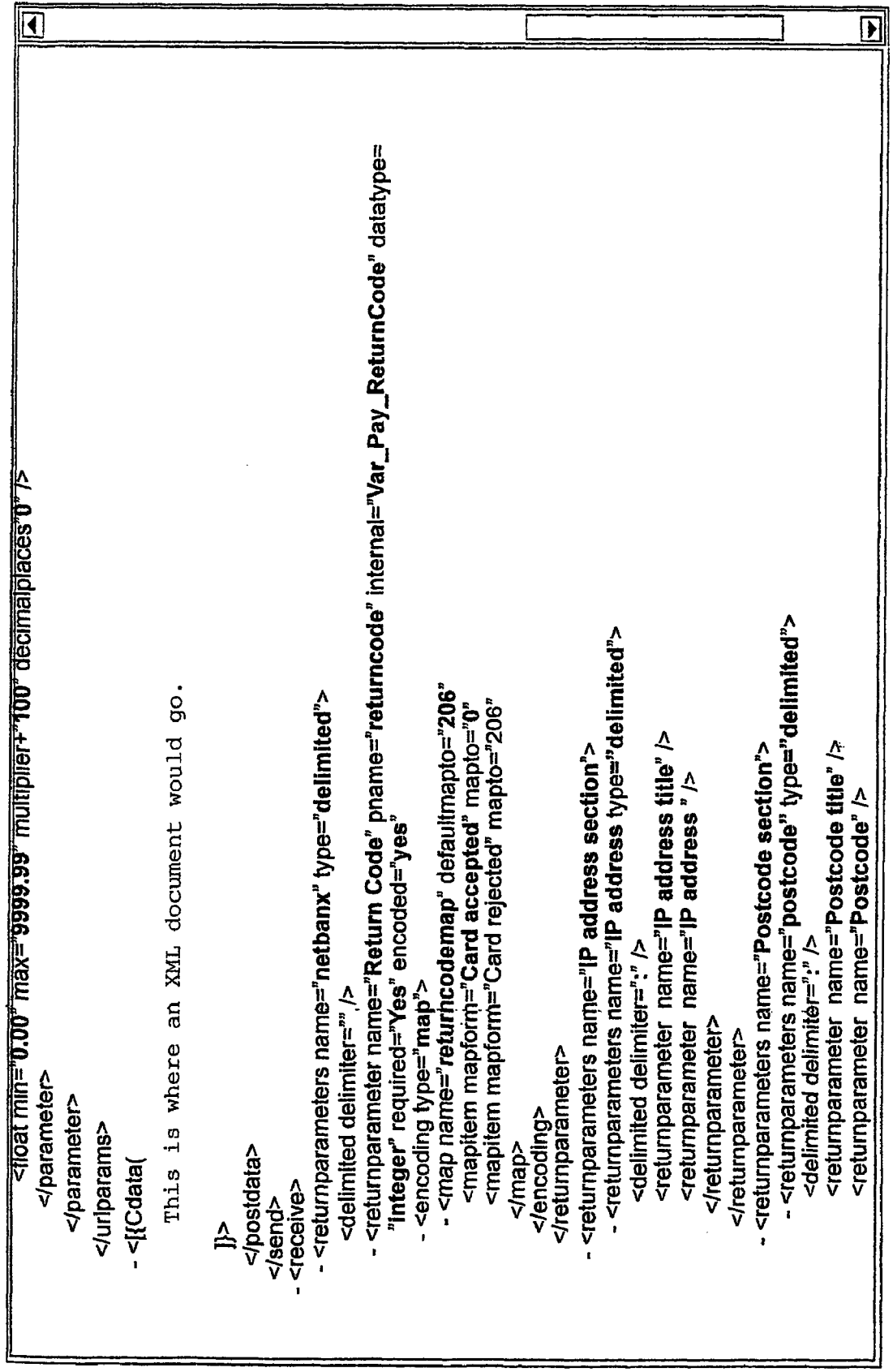
Figure 5F:
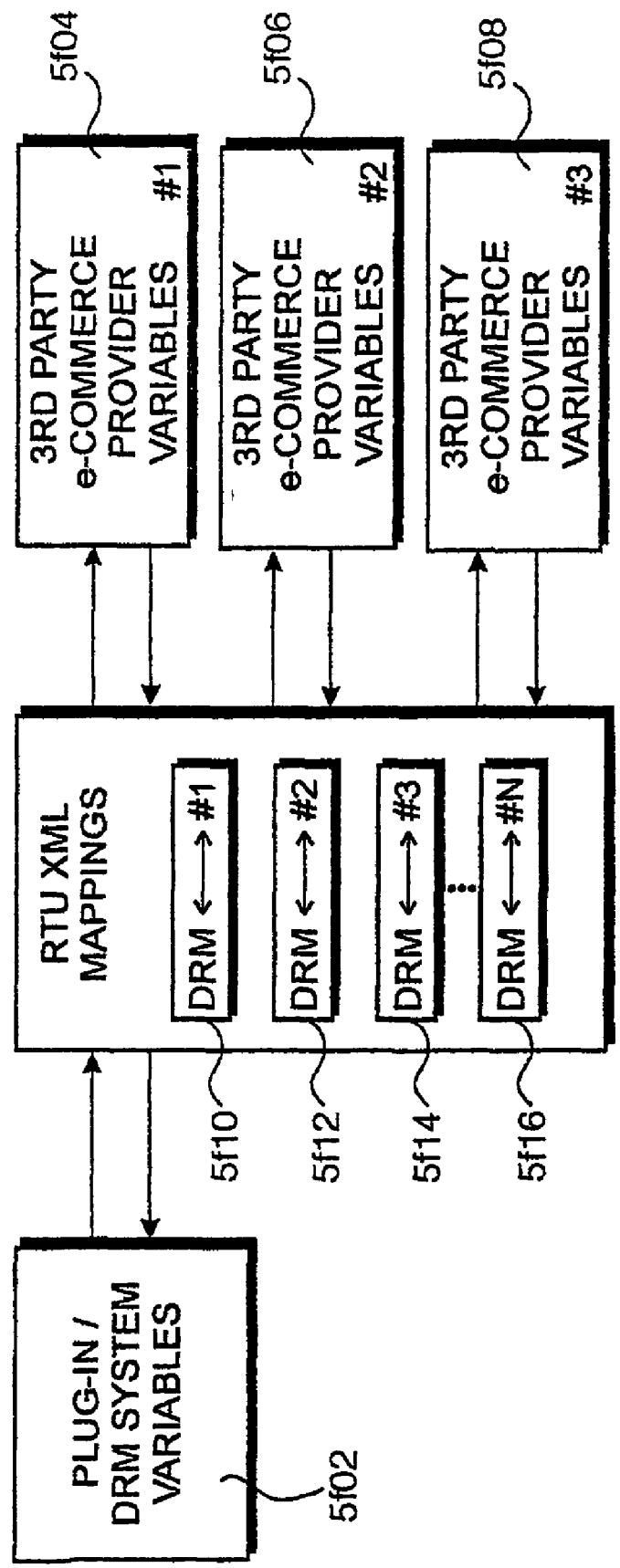

Referring to FIGS. 5e and 5f there is shown both schematically and in the form of an XML RTU (Rights To Use) XML interface mechanism, which defines and implements the mapping between an interface of the digital rights management system 100, more particularly the remote licensing server 104, and a third party e-commerce provider, such as, for example, WorldPay, NetBanx or beenz. The RTU XML is used to collate data required by an e-commerce provider to support an e-commerce transaction. The data exchange between the remote licensing server, which uses a comprehensive generic set of variables relating to information required to support an e-commerce transaction, and the third-party e-commerce provider is defined by the RTU XML file. Each e-commerce provider has a corresponding RTU XML file which forms a mapping between the DRM system 100 variables and the data required by the e-commerce providers to support a transaction. The send protocol definition maps financial data collated by the plug-in 122, and provided to the licensing server 104, to variables that are used by the e-commerce provider so that the e-commerce provider can process the transaction. The receive definition performs the reverse operation so that the prospective purchaser can be informed of the successful status or otherwise of the e-commerce transaction.

Referring to FIG. 5f there is shown schematically the concept underlying this aspect of the present invention. A significant list of variables 5f02 which relate to financial data required by or collated by the plug-in 122 are mapped to corresponding variables of third party e-commerce providers 5/04, 5/06 and 5/08 via respective RTU XML files 5/10 to 5/16. If for example a new third party e-commerce provider was established, the digital rights management system 100 could accommodate readily that new third party e-commerce provider and allow a prospective purchaser to transact business via that third party e-commerce provider simply by generating an appropriate RTU XML file and storing that file for use by the remote licensing server 104 together with the existing RTU XML files in the payment processor 126 of the remote server 104.

It will be appreciated that the use of RTU XML files greatly increases the flexibility DRM system 100 in terms of being able to accommodate or adjust to changes in e-commerce providers. The example shown in FIG. 5e relates to the mapping between the DRM system variables and those variables that are of use to NetBanx.

Figure 6:
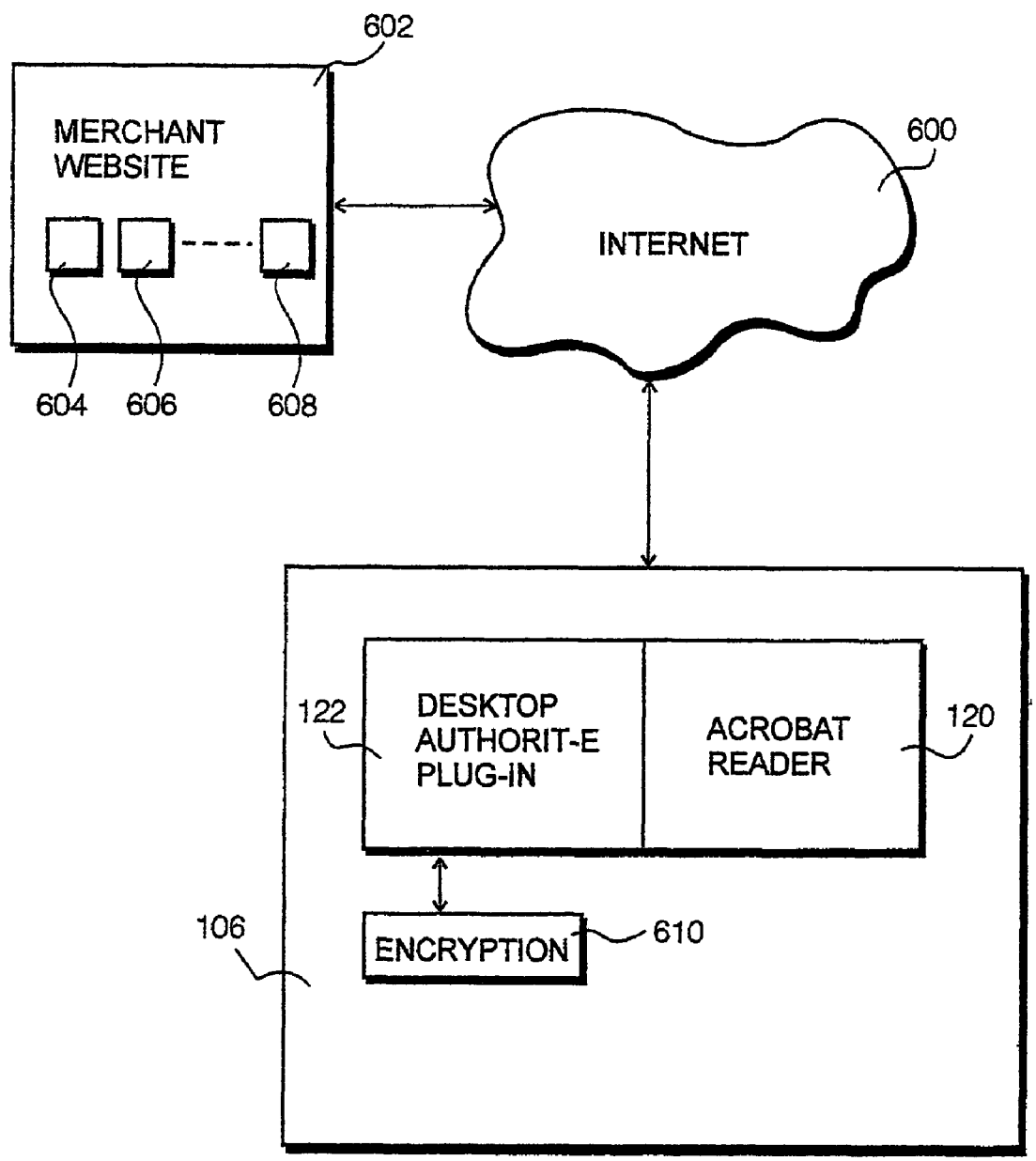
FIG. 6 shows a client machine connected to the Internet.

Referring to FIG. 6 there is shown a client machine 106 connected to the Internet 600. Also connected to the Internet 600 is a merchant server having a web site 602 that contains a number of secure wrapped digital content files 604 to 608. A prospective purchaser when viewing the web site using an appropriate browser at the client machine 106 can select one of the secure wrapped digital content files 604 to 608. The selection of one of the secure wrapped digital content files causes it to be downloaded to the client machine 106. Further invocation of the downloaded copy of the secure wrapped digital content file causes the Adobe Acrobat reader 120 to be launched. The Acrobat reader is arranged to process the wrapped content file using the plug-in 122. The plug-in 122 instigates the licensing of the encrypted digital content to the prospective purchaser. The secure wrapped digital content file 110 is encrypted using an associated ç-Dilla slot as is known in the art. The licensing process enables that slot which allows decryption of the digital content and renders it useable at the client machine subject to the publisher prescribed licensing terms and conditions.

Figure 7:
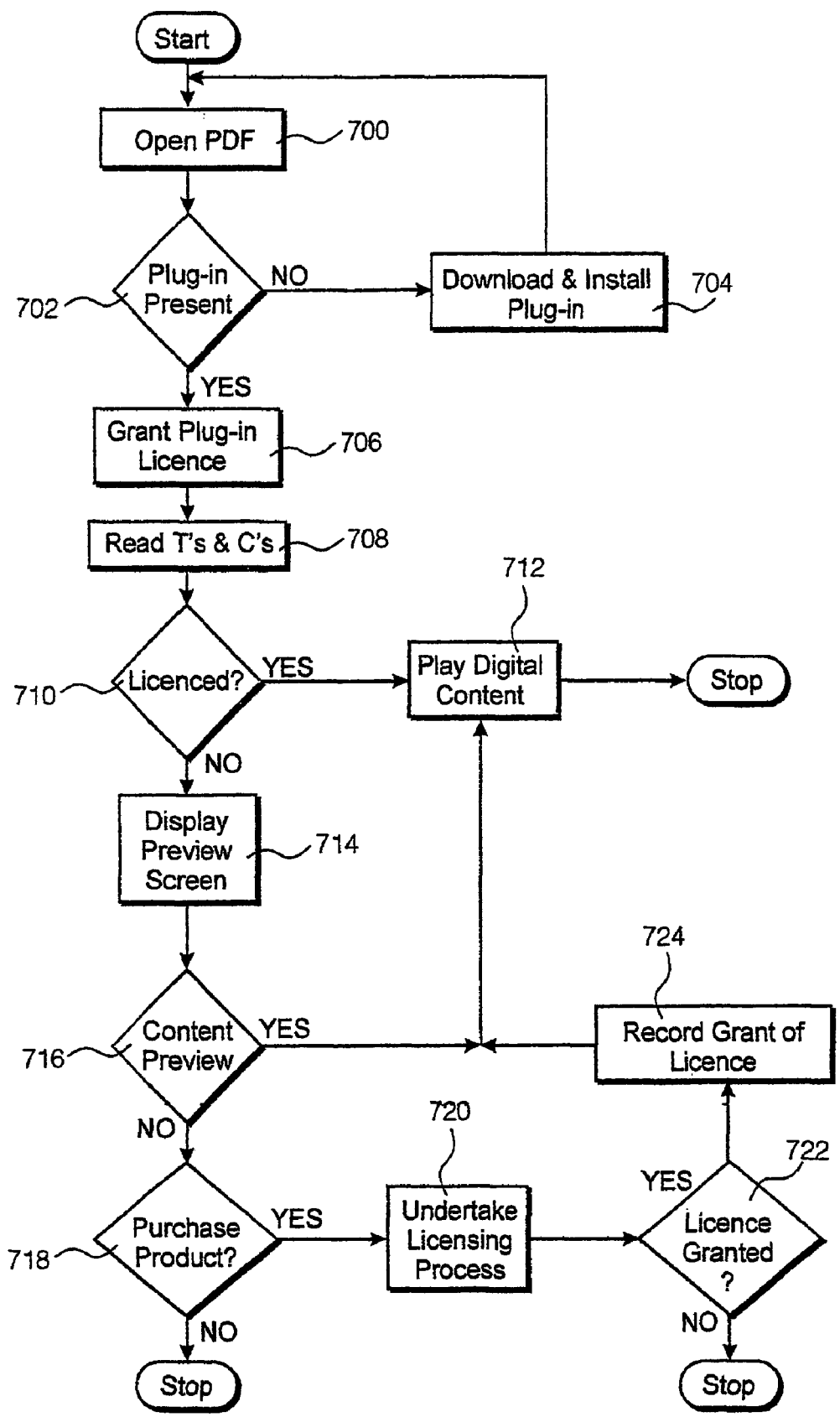
FIG. 7 illustrates the flow of control undertaken by the plug-in upon invocation of a secure wrapped digital content file.

FIG. 7 illustrates the flow of control undertaken by the plug-in 122 upon invocation of a secure wrapped digital content file.

At step 700 a user (not shown) attempts or opens the PDF file which comprises the encrypted digital content. It will only be possible for the Adobe Acrobat reader 120 to process correctly and open the PDF file or wrapped content file 110 if the appropriate plug-in 122 is present. Therefore, step 702 determines whether or not the requisite plug-in 122 is present. If it is determined that the plug-in 122 is not present, it is downloaded and installed at step 704 using a reference to a URL at which the appropriate plug-in installation program is located and processing returns to step 700 in which a further attempt is made to open the wrapped content file 110.

If it is determined that the plug-in is present, the plug-in automatically grants to the user, indirectly, permission to decrypt the first private XML object 204 which, as described above, contains the metadata, the initial GUI and branding, a list of trusted applicants and a reference to the remote licensing server 104. The license status data of the wrapped content file 110 is determined at step 708. If it is determined at step 710 that the user is already licensed, the private XML object 206 which contains the digital content is decrypted and output via one of the trusted applications at step 712. In a preferred embodiment step 708 is realised by the first private XML object supplying to the client information identifying an associated ç-Dilla slot and an anticipated slot status. The client via an API call determines the actual state of the ç-Dilla slot and compares the actual slot state with the anticipated slot state. If the compared slot states match, a further ç-Dilla API call is made which opens the digital content into one of the trusted applications.

If it is determined at step 710 that the user is not licensed, invoking the secure wrapped digital content file 110 produces an ordering screen at step 714. Preferably, the ordering screen also comprises appropriate publisher branding. An optional step at 716 may be provided according to the publisher's preferred mode of operation in which the user can preview the digital content subject to terms and conditions that can be specified by the publisher. Therefore, if an embodiment provides for content preview, the digital content is output at step 712. Such preview will typically have a limited lifetime. However, if there is no content preview, control is transferred to steps 718 at which the user is asked whether or not they wish to purchase the product. If the user declines the invitation to purchase the process is terminated. However, if the user accepts the invitation to purchase control is passed to step 720 at which the user is led through a publisher prescribed licensing process and is granted a license subject to fulfilment of that publisher prescribed licensing process. A determination is made at step 722 as to whether or not the user has been granted a license. If the user has not been granted a license the process is terminated. However, if the user has been granted a license, the grant of that license is recorded at step 724 for possible future use in step 710 and control is transferred to step 712 at which the digital content is output.

Figure 8:
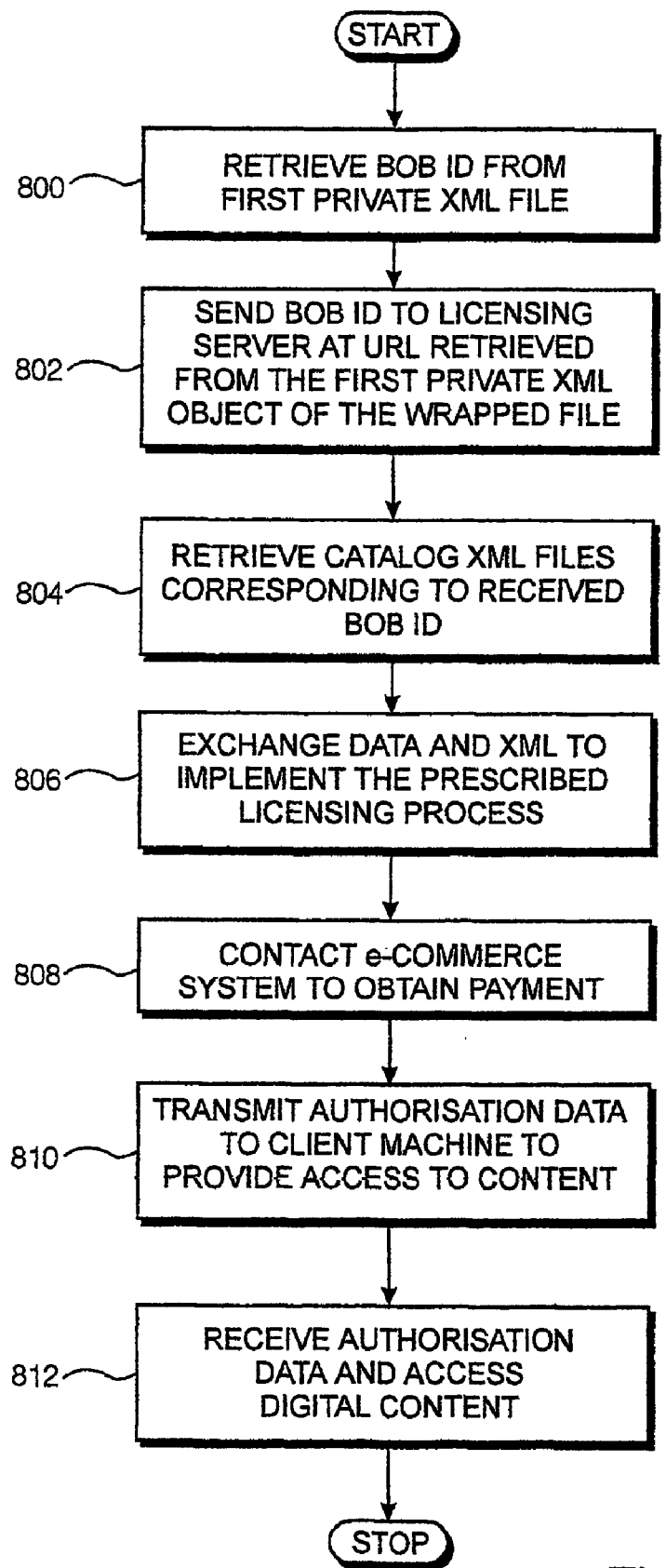
FIG. 8 illustrates the processing steps that are involved in performing the licensing process step of FIG. 7.

Referring to FIG. 8 there is shown the processing steps that are involved in performing the licensing process step 720 of FIG. 7.

Figure 10:
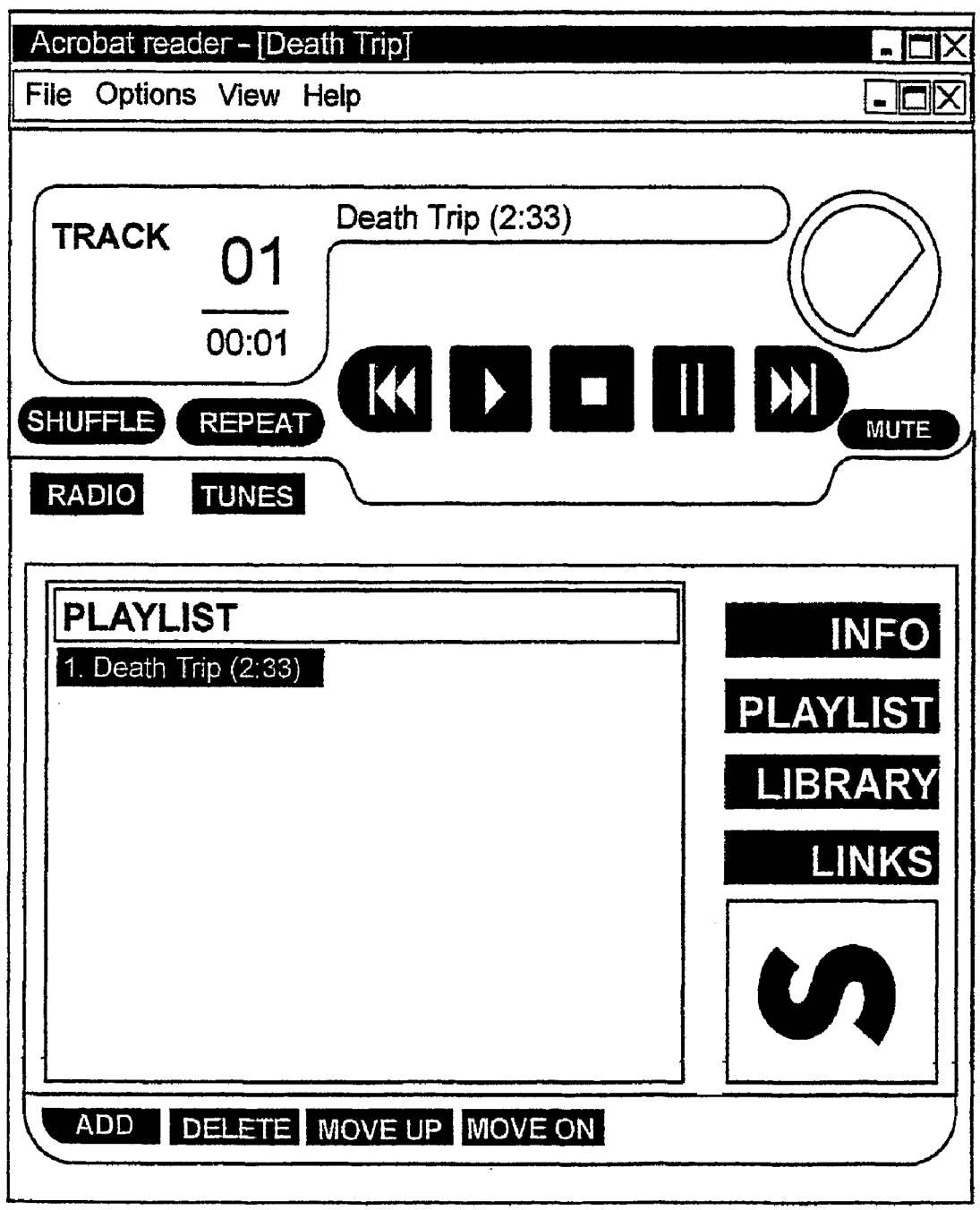
FIG. 10 shows a screen capture of the output produced by a Destiny media player.

Assuming that the client machine 106 already has the appropriate plug-in 122, invocation of the secure wrapped digital content file 110 will produce an electronic wrapper or cover such as illustrated in FIG. 9. The electronic cover comprises graphical information and a play button 900. The selection of the play button causes step 710 of FIG. 7 to be executed if the user is already licensed. An application, which is one of the trusted applications, which must already be present on the client machine 106, will be launched to output or play the licensed digital content. There is shown in FIG. 10 a screen capture of the output produced by a Destiny media player. However, if the product is not licensed and does not have an associated preview, the user is afforded the opportunity to purchase the product and a screen such as that shown in FIG. 11 is output. The screen 1100 provides still further visual information relating to the product 1102 and also contains a number of buttons 1104 that can be used to guide the user through a publisher prescribed or merchant prescribed licensing process at step 720 of FIG. 7. As mentioned above, referring to FIG. 8, there is shown in further detail the processing steps of licensing step of 720. The product ID (BOB ID) 5b00 is retrieved from the first private XML at step 800. An example of the BOB ID, 1000007961, is shown in appendix 4 as part of the first private XML file, SECUREHEADER.XML. The client machine 106 at step 802 sends the BOB ID to the remote licensing server 104 using the licensing server a URL 212 and 5c04 retrieved from the first private XML object 204 of the secure wrapped digital content file 110. At step 804 the remote licensing server retrieves using the BOB ID received from the client machine 106 the corresponding BOB Stores and Inventory XML files, that is, the catalogue XML files are retrieved which contain, amongst other things, the pricing information, the licensing process, the export control information and the license terms and conditions. During the subsequent exchange between the licensing server and the client machine, the licensing process is progressively undertaken at step 806. The process at 806 will be described in further detail hereafter and involves a number of exchanges of XML files between the client machine 106 and the remote licensing server 104. The SECUREHEADER XML contains a BOB ID and a URL for the licensing server 104. When a client encounters a situation that is outside the parameters of current permitted use for the digital content, the BOB ID is sent to the licensing server via the URL. The licensing server identifies within the XML catalog the received BOB ID to locate the corresponding BOB, STORES and INVENTORY XML files, which contain the pricing information, license process information, export control information and license terms and conditions information. The license process information defines the HTML or XML which is communicated to the client machine at each stage of the licensing process; namely start, confirm, accept, reject, error or expired. The client machine interprets each of these XML communications (which contain the send, receive, process and GUI sections) to present the user with a user-interface, capture the input and send it to the next step of the process as defined in the process section of the XML. Additionally, the licensing server may contact a third party e-commerce system, for example, to clear a credit card or provide some other form of payment, e.g., Air Miles. If approval is received from the third party e-commerce system, the licensing server requests data, or in an embodiment which uses ç-Dilla technology, a response code, from the encryption system in accordance with the licensing terms and conditions defines by the XML catalog. For example, if the digital content relates to a monthly publication on an annual basis and is intended to be published or licensed as such, the response code will be such that the digital content will be made available by activating the appropriate number of ç-Dilla slots. The response code is sent to the client machine which forwards the response code to the encryption system resident at the client machine to alter the license state of the digital content accordingly.

Having undertaken the licensing process, the remote licensing server 104 contacts a third party e-commerce service provider to obtain payment in exchange for the grant for the impending grant of a license to use the digital content. The contact with the third party e commerce service provider is established using a merchant URL that is contained within the stores XML. The exchange between the remote licensing server 104 and a third party e-commerce service provider server is determined or undertaken using the RTU XML file as described above with reference to FIG. 5e and FIG. 5f.

Having obtained payment at step 808, the remote licensing server 104 determines from the inventory XML file which authorisation data is needed by the encryption system 610 used at the client machine 106 to decrypt and afford access to the digital content. The remote licensing server transmits that authorisation data to the client machine at step 810. Upon receipt by the client machine of the transmitted authorisation data at step 812, the plug-in 122 forwards the authorisation data to the encryption system which renders the digital content usable by any one of the trusted applications only.

Although the above embodiment has been described with reference to the use of a ç-Dilla encryption system, it will be appreciated by one skilled in the art that other encryption systems can be used as alternatives. Indeed an aspect of the present invention relates to the flexible nature in which a suitable encryption system can be selected and used within embodiments of the present invention. If an alternative encryption system is planned to be used or supported, the skilled person merely has to amend or produce an appropriate Inventory XML file which map the generic licensing terms and conditions of the DRM system 100 to the specific encryption control or access commands of the encryption technology employed. In a manner analogous to that described with reference to FIGS. 5e and 5f, the Inventory XML file in effect provides a mapping or translation between a first set of generic licensing terms and conditions and a second set of technology specific licensing terms and conditions or encryption control features. The generic licensing terms and conditions of the embodiments of the present invention can remain constant and can be mapped onto the licensing functionality of the underlying encryption technology. Accordingly, a change of supporting encryption technology can be accommodated merely by changing appropriate mappings in an XML file.

Electronic software distribution (EDS) and electronic license distribution (ELD) is the secure movement of software, and its associated license agreement and terms and conditions of use, from a software publisher through a distributor and reseller channel, to a customer. Typically the medium used for such secure movement is the Internet. It will be appreciated that software comes within the ambit of the term "digital content".

Although the above embodiments use, for example, credit cards to effect payment, the present invention is not limited thereto. Other forms of payment other than monetary payment such as for example, beenz or Air Miles, may be utilised and payment details appropriate to the transfer of such other forms of payment may be utilised.

Upon selection of the play button 900 shown in FIG. 9, if the digital content, which is, in the illustrative example, an MP3 file by the Stooges entitled Death Trip, is unlicensed the prospective purchaser will be presented with a screen 1100 such as is shown in FIG. 11. The screen comprises two portions namely an outer skin, known as a skin outer, 1106 and a skin inner 1102. The screen 1100 also comprises a number of selection buttons 1104 that are used to guide a prospective purchaser through a publisher or merchant prescribed licensing process. The licensing process is controlled or dictated from the remote licensing server 104. The remote licensing server 104 retrieves from a licensing database 124 the licensing process and licensing terms and conditions that are applicable to the current wrapped digital content file. The remote licensing server 104 retrieves the Stores XML file which contains a definition of the licensing process 5c00 that must be performed by the prospective purchaser before access is granted to the digital content. The various aspects of the licensing process 5c00 manifest themselves in the form of corresponding buttons and/or forms to be actuated by or completed by the prospective purchaser. In the illustrative example, the buttons are "order", "info" and "cancel". The "order" button is used by the prospective purchaser to progress an order for the digital content. The "info" button is used to display further information such as the information shown in FIG. 17, which closely reflects the metadata of the wrapped content file. The cancel button is arranged to terminate the licensing process and, optionally, close the electronic cover.

Figure 14:
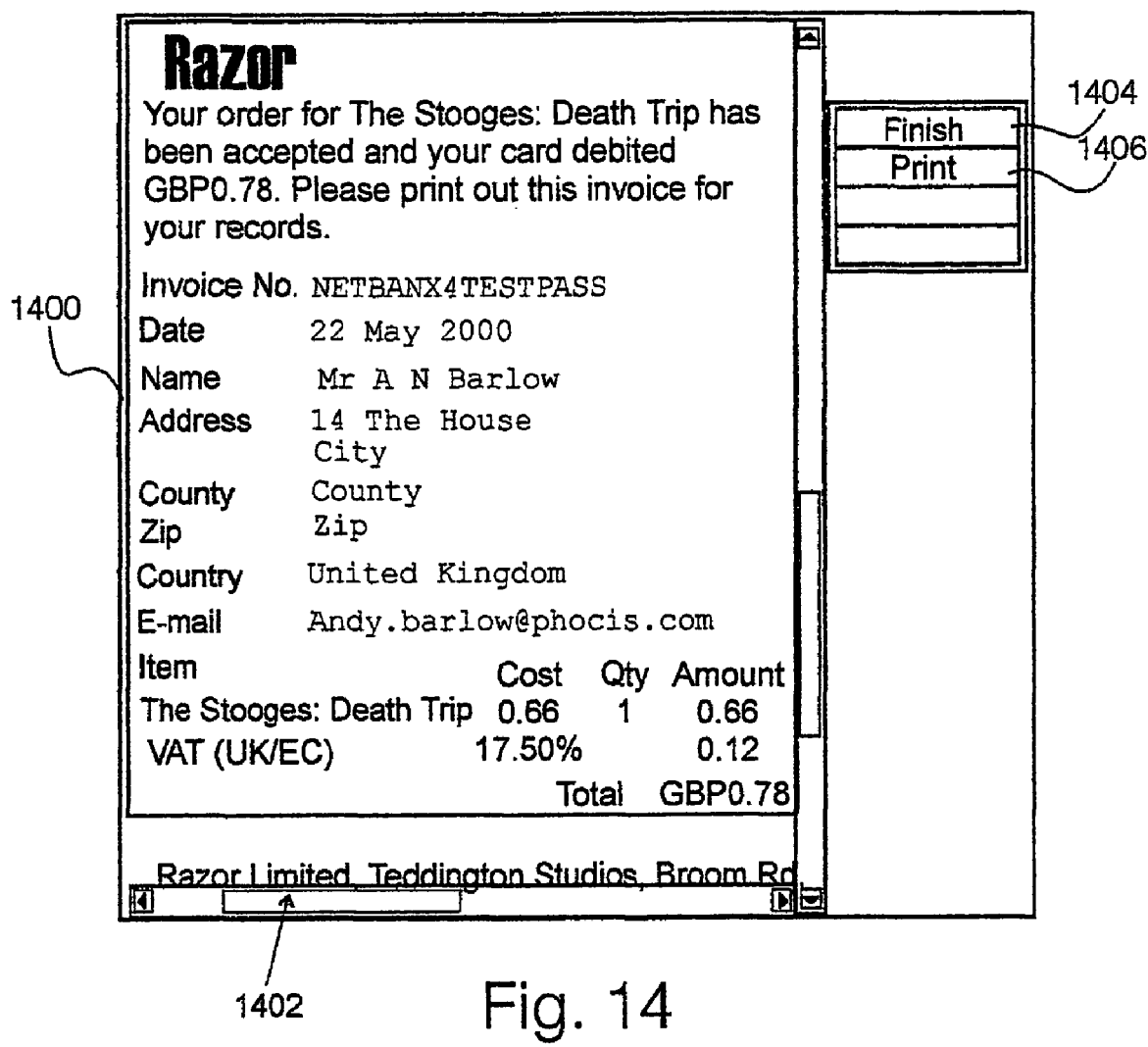
FIG. 14 depicts a licensing process screen capture showing confirmation of receipt of payment.
Figure 16:
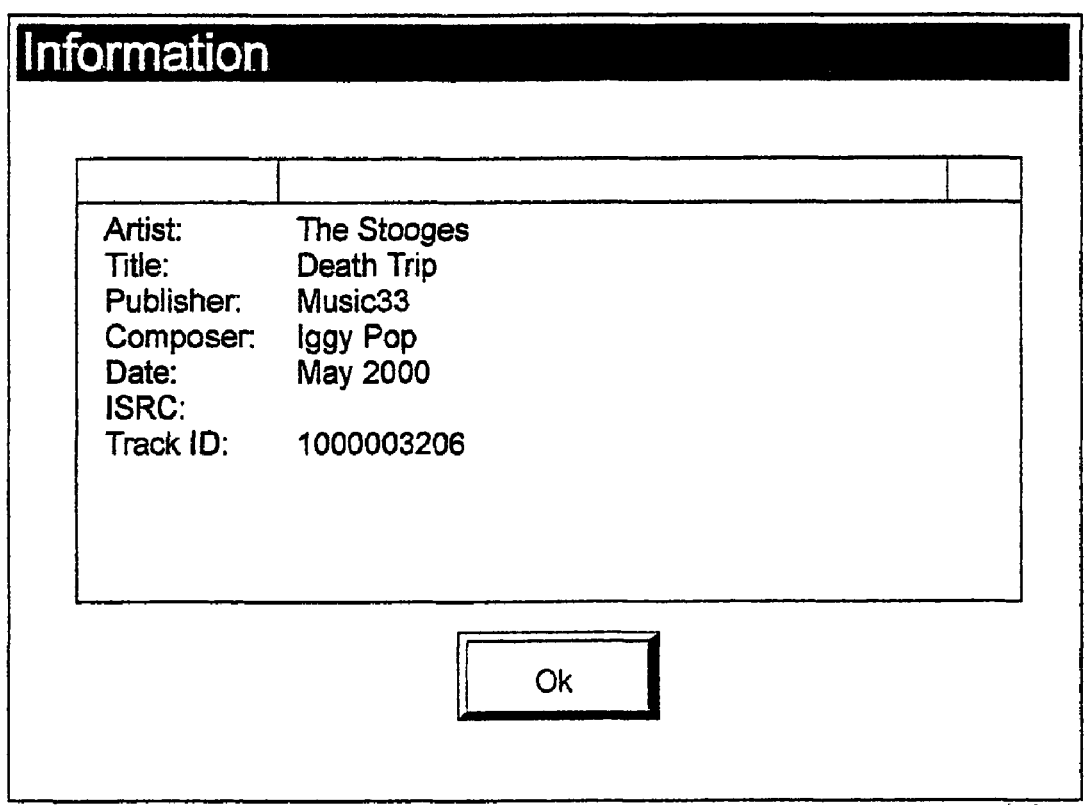
FIG. 16 illustrates the metadata that is displayed when the information button is selected.

Selecting the "order" causes the plug-in 122 to contact the remote licensing server with an indication that the prospective purchaser would like to purchase the digital content. The remote licensing server, in the illustrative embodiment, continues with the licensing process and outputs a screen 1200 as shown in FIG. 12 by forwarding to the client machine 106 a supporting XML file, which in the illustrative example is startorderXML="raiserstartorder.XML" which contains the data definitions and embedded HTML required to drive the commencement of the licensing process for the current digital content. It can be seen that the startorderXML produces a form 1202 that must be completed by a prospective purchaser and two buttons, that is, a "submit" 1204 and a "cancel" 1206. The cancel button has the same effect as the cancel button described in relation to FIG. 11. The "submit" 1204 causes the details entered in the form 1202 by the prospective purchaser to be transmitted to the remote licensing server 104. The remote licensing server extracts the information contained within the startorder form 1202 and causes the client machine 106 to progress to a confirm order state in which the screen shown in FIG. 13 is displayed with the assistance of the confirmorderXML="eraserconfirmorderXML" file 5c10 of the stores XML file. The screen 1300 shown in FIG. 13 duplicates the information provided by the prospective purchaser via the form 1202 and also comprises a "confirm" button 1302 and a "cancel" button 1304. The cancel button operates substantially as described above. Upon actuation of the "confirm" button 1302 by the prospective purchaser the remote licensing server 104 is informed of the confirmation by the prospective purchaser. In response to receiving the confirmation, the remote licensing server communicates with the third party e-commerce service provider as defined in the RTU interface XML file, which acts as a translator between the variables used by the remote licensing server 104 and the third party e-commerce service provider server. Upon receipt of acceptance of payment or confirmation of payment from the third party e-commerce service provider, the remote licensing server 104 causes the screen 1400 as shown in FIG. 14 to be output by the client machine to provide confirmation of the acceptance of payment. The payment accepted screen 1400 comprises the payment details 1402, a finish button 1404 and a print button 1406. The payment accepted screen is generated via an XML file such as, for example, the acceptXML="eraseraccept.XML" file 5c12 as shown in FIG. 5c. If the purchaser invokes the finish button 1404 the licensing process concludes with the transfer of the response code/unlock code generated by the encryption engine at the licensing server in accordance with publisher's terms and conditions. The response code changes the license status of the client machine in accordance subject to publisher's wishes. In a current embodiment which is realised using ç-Dilla technology, the effect of the response code is to license a particular slot in accordance with the publishers' terms and conditions so that, for example, the slot can be permanently licensed or have an associated time or credit limit. If the purchaser selects the print button 1406 an invoice, such as is shown in FIG. 15 is printed which contains the details of the transaction.

Figure 17:
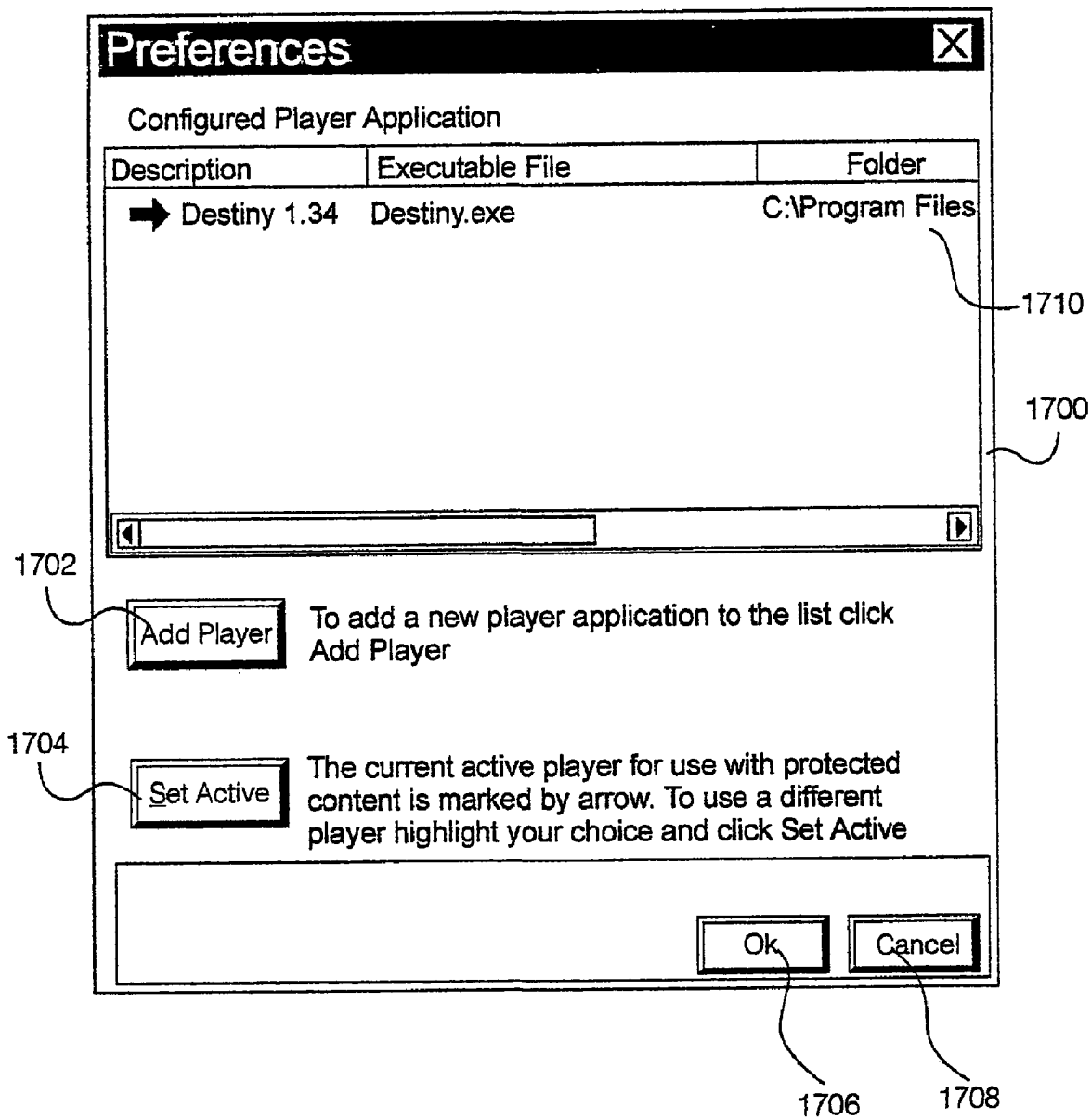
FIG. 17 illustrates a trusted application management facility screen capture.

Referring to FIG. 17 there is shown a screen capture 1700 of a trusted player management facility that is executable at the client machine 106 to select a preferred trusted application from the list of possible trusted applications that are embedded within the first private XML object 204. It can be seen that there are several buttons 1702 1704 1706 and 1708 for controlling the trusted player management facility. The Add player button 1702 allows the list 1710 of preferred trusted application to be extended by adding to that list 1710 further trusted applications selected from the list embedded within the first private XML object 204. The set active button 1704 selects the currently identified trusted application within the list 1710 to be the preferred trusted application for its associated wrapped content file 110. The OK button 1706 confirms the changes or operations effected using the trusted player management facility and closes that facility. The Cancel button 1708 cancels any operations that were planned to be effected using the trusted player management facility.

Although the above embodiment has been described with reference to the use of two private XML files (namely XML files 204 and 206) the present invention is not limited thereto. Embodiments can be realised in which the second XML file 206 is merely a file containing the digital content in native form such as, for example, an MP3, PDF file etc.

Advantageously, the embodiments of the present invention by separating the license information and metadata from the digital content itself, allows the present invention to accommodate native file formats without modification. Essentially, native file formats do not support or have no inherent licensing or rights management capabilities. Therefore, incorporating any such native file formats within a file format according to the embodiments of the present invention effectively endows those native file formats with DRM capability and allows the usage of such native file to be managed in accordance with a publisher's terms and conditions.

Still further, the extent and expression of MIME type specific metadata can be altered by the publisher on a MIME-type by MIME-type basis as can be seen from the sample XML, which forms part of the private XML object 204 of FIG. 2, shown below

```
<content mimetype="application/pdf">
    <metadata source="document">
        <Argument name="part-number" value="PHO-012345" displayname="Part Number"/>
        <Argument name="title" value="Authorit-e Secure PDF Demo" displayname="Title"/>
        <Argument name="artist" value="Al" displayname="Author"/>
        <Argument name="publisher" value="Phocis Ltd" displayname="Publisher"/>
        <Argument name="publish-date" value="August 2000" displayname="Publication Date"/>
        <Argument name="standard-resource-code" value="GB-PHO-98765" displayname="Document Object Identifier"/>
    </metadata>
```

It can be appreciated that the metadata & its display name & values are completely definable on a MIME type basis. The above example is a PDF document.

It can be appreciated that the metadata and its display name and variables are completely capable of definition on a MIME type basis. The above example illustrates a MIME type definition for a PDF document. This allows a range of metadata to be defined that is specific to a particular MIME type so that, for example, an MPME file may have artist, composer, track length, sample rate etc., whereas a financial report may a title, author, ISBN, number of pages etc.

The above embodiments are also arranged to provide an arrangement by which the usage of unwrapped digital content can be monitored or metered and restricted accordingly. For example, in the case of an MP3 file, there may be provide two meters that monitor the number of complete plays and the number of plays having a duration greater than 30 seconds. An embodiment of the present invention provides three meters for PDF digital content as can be seen from the XML below which describes the controlled features.

```
        <!-- Print operations & printers -->
            <printing enabled="yes">
        <!-- Set whether printing is permitted at all -->
        <print-to-file enabled="no"/>
        <!-- Enable/disbale "print to file" -->
            <print-range>
                <pages-all enabled="yes"/>
        <!-- Allow printing of entire document -->
                <pages-current enabled="yes"/>
        <!-- Allow printing of current page -->
                <pages-range enabled="yes"/>
        <!-- Allow printing of a user-specified page range -->
            </print-range>
            <printers>
        <!-- Specify each printer to disable -->
                <printer enabled="no">
        <!-- 1st disabled printer -->
                    <name>Acrobat Distiller</name>
                </printer>
                <printer enabled="no">
        <!-- 2nd disabled printer -->
                    <name>Acrobat PDFWriter</name>
                </printer>
            </printers>
```

The XML below defines the watermark that is overprinted on the licensed PDF when printed.

```
    <overprint>
                <!-- "config" contains a watermark structure
    formatted -->
                <config>
    <! [CDATA[
    [options]
    font=Arial
    psfont=Helvetica
    size=8
    [stamp0]
    format=ne, r
    text0=Page $page$ of $pages$
    [stamp1]
    format=nw, 1
    text0=Printed on: $date$ $time$
    text1=AUTHORIT-E PRINT CONTROL DEMO
    [stamp2]
    format=sw, 1
    text0=www.authorit-e.com
    ]]>
                </config>
            </overprint>
        </printing>
```

The following XML defines the available meters, their initial conditions and the features to which they relate.

```
<!-- Set up the meter info here. You should only include one meter
element with attribute value default="yes". -->
    <meters>
            <!-- Meter ID 0 meters the total number of permitted print
operations -->
            <meter meter.id="0" default="yes" incrementable="yes"
decrementable="yes">
                <name>Prints Meter</name>
                <desc>Printing of this document is restricted to a set
total number of prints.</desc>
                <unit unit.id="0">
                    <desc>prints</desc>
                </unit>
                <init-credits>5</init-credits>
            </meter>
            <!-- Meter ID 1 meters the total number of pages which can be
printed -->
            <!--
            <meter meter.id="0" default="yes" incrementable="yes"
decrementable="yes">
                <name>Pages Meter</name>
                <desc>Printing of this document is restricted to a set
total number of pages.</desc>
                <unit unit.id="2">
                    <desc>pages</desc>
                </unit>
                <init-credits>5</init-credits>
            </meter>
            -->
            <!-- Meter ID 2 meters the printing by number of days -->
            <!--
            <meter meter.id="0" default="yes" incrementable="yes"
decrementable="no">
                <name>Time Meter</name>
                <desc>Printing of this document is restricted to a set
number of days.</desc>
                <unit unit.id="1">
                    <desc>days</desc>
                </unit>
                <init-credits>5</init-credits>
            </meter>
            -->
    </meters>
```

It can be seen from the above that zero total prints are permitted, the total numbers of pages that can be printed is defined to be 2 and that can only be effected for a single day.

Although the above embodiments have been described with reference to granting access to digital content in exchange for payment, the present invention is not limited thereto. Embodiments can be realised in which access is granted alternatively or additionally to specifically identifiable parties or client machines/devices to restrict, for example, circulation of digital content. Furthermore, the term client includes devices such as mobile or portable radio communication devices.

Although the above embodiments have been described with reference to the data entity containing the digital content to be rendered, embodiments of the present invention can equally well be realised in which the data entity contains a reference which can direct the second application to the digital content, that is, the digital content may represent, for example, a URL that is used, by a web-browser, to access the digital content that is rendered using a trusted application. It will be appreciated that if the reference is to streamed media, an appropriate URI would be used on conjunction with, for example, the Real-Time Streaming Protocol.

A further advantage of the embodiments of the present invention is that the data entity does not contain any decryption information such as, for example, decryption keys since including such keys within the data entity represents a risk which may compromise the security of the data entity.

It will be appreciated that in the above embodiments, should an action be attempted in relation to the data entity which is not licensed or permitted, rather than merely outputting an error message or an indication that the attempted action is prohibited, a reference is made to a remote licensing server and the user is taken through the licensing process to obtain authorisation to perform the prohibited action. For example, if a user had read-only access for a document and that user attempted to print the document, the user would be informed that the print action was prohibited and automatically referred to the licensing server where permission to print the document can be obtain by following a licensing process. By requiring or using such a reference to the licensing server, control is maintained by the publisher of the data entity or digital content over the licensing process and/or licensing conditions.

The above examples of the present invention have been demonstrated with reference to licensing a single item of digital content. However, embodiments of the present invention can equally well be realised in which a license can be granted to a plurality of items of digital content either jointly or severally. For example, a user may subscribe to an on-line monthly publication and obtain authorisation to read each publication on a publication-by-publication basis, that is, monthly or a license may be granted on an annual basis, that is, the user is authorised to view the monthly publications in advance of the publications being published.

Furthermore, since the licensing terms and conditions are controlled and granted independently of the publication of the digital content, control can be maintained over the licensing process and the licensing terms and conditions. Therefore, a publisher can readily change the terms and conditions that are applicable to digital content and/or the publisher can change the licensing process applicable to the digital content.

By arranging for the remote licensing server to be accessed to take a user through a licensing process and to apply or change licensing terms and conditions, the remote server can issue terms and conditions which, in effect, revoke any previously granted licensing in whole or in part.

As mentioned above, a further aspect of the present invention is the use of the data entity and trusted applications to render computer viruses and, in particular, macro-based viruses ineffective. Conventionally, word processing documents, such as, for example, Microsoft Word documents, are also capable of having associated therewith executable macros. Normally any such macros are arranged to assist the user. However, in the case of an unscrupulous author of harmful macros, the integrity of the computer and the data stored thereon or accessible therefrom can be compromised. Harmful macros are given effect when a document containing such macros is rendered within a run-time environment that supports such macros or at least the instructions constituting such macros. As is well known within the art, Microsoft Word is such an environment. Within the context of the present invention the second encrypted data may be digital content containing executable macros which when rendered by an appropriate application causes the macros to execute. However, rather than the appropriate application being the trusted application, a substitute application which while being capable of rendering the digital content does not contain any means for supporting macros or other executable instructions contained within or associated with the digital content. Therefore, when the digital content is rendered, the potentially harmful macros are rendered ineffective.

However, within embodiments of the present invention, the second application which would be used to view the document or digital content represented by the unencrypted version of the second encrypted data does not contain means for giving effect to macros, that is, the second application may be a simple viewer such as, for example, (Please list suitable types of viewer) or an application which does comprises such means but those means having been disabled. It will be appreciated that this additional functionality can be used jointly or severally with all or any combination of the above described embodiments.

This embodiment finds particular application in the distribution and licensed control of documents such as, for example, word processing documents. It will be appreciated by one skilled in the art that many word processing documents may also contain macros which, generally, serve a useful purpose within the document. However, unscrupulous third parties can arrange for macros to compromise the integrity of the documents or data stored within a client machine upon execution of those macros. The macros are in effect operable within a run-time environment. For example, macros that are applicable to Microsoft Word are executable within a Microsoft Word context since Microsoft Word comprises means for giving effect to the instructions of the macros. However, within embodiments of the present invention, the second application which would be used to view the document or digital content represented by the unencrypted version of the second encrypted data does not contain means for giving effect to macros, that is, the second application may be a simple viewer such as, for example, Microsoft Word Viewer or an application which comprises such means but those means having been disabled. It will be appreciated that this additional functionality can be used jointly or severally with all or any combination of the above described embodiments.

Listed below are appendices showing the data objects that can be used to realise embodiments of the present invention. A brief summary of the function of each of the data objects is given below

BOB.XML

This data object identifies a secure package containing protected digital content to the remote licensing server.

INVENTORY.XML

This data object indicates to the licensing server how a particular piece of digital content is encrypted, such that the licensing server can respond appropriately to requests to 'unlock' the content during a licensing transaction. The data object can additionally define export restrictions applicable to the protected digital content.

STORES.XML

This data object identifies authorisation/payment parameters to the licensing server for use during licensing transactions, including references to the authorisation mechanism and resources used to guide the user through the authorisation process.

SECUREHEADER.XML

This data object comprises data that is embedded in the secure package file to identify and describe the package to the client application, and includes information such as licensing parameters and package metadata. When embedded in a secure package, this data is encrypted to prevent unauthorised use.

SERVICESSPECIFICATION.XML

This data object describes available publishing options for use by the publishing system when creating a secure package.

STANDARDHEADER.XML

This data object comprises data that is embedded in unencrypted form in the secure package and describes certain encryption parameters pertaining to the mechanism used to encrypt the secure package header XML. Note that it does not contain, in itself, sufficient data for a malicious third-party to decrypt the secure header XML.

RTU.XML

This data object describes a particular third-party authorisation/payment mechanism for use by the licensing server during a licensing transaction. The format facilitates the integration of new payment mechanisms into the licensing server's capabilities.

Appendix 8 illustrates an unencrypted version of the first encrypted data object of the data entity.

APPENDICES

SUPPORTING XML FILES

APPENDIX 1

BOB.XML

```
<bob action="startorder" validatedata="Y" skutype="Full"
store="PHOCIS" id="1000008028" sku="M33-000822-03">
</bob>
```

APPENDIX 2

INVENTORY.XML

```
<sku delivery="virtual" product.type="mp3" sku="M33-000822-03"
description="Mr Scruff: Camel's Foot" catalog="PH0001"
url="http://www.music33.com">
    <!-- (skutype+ )-->
            <skutype skutype="Full" description="Full">
        <!-- (keyserver* , source.country+ )-->
                    <keyserver type="cdilla">
        <!-- (cDilla | rainbow | elan | cdkey | phocis )-->
                            <cDilla cdilla.licence="B015C000">
                                <reqTypeInstall>
                                    <!-- answer an
install request with an enable subgroup 2 -->
                                    <rspTypeSubgroupSet
ExpiryDate="" SubGroup="1025"/>
<rspTypeInstallWithExpiry ExpiryDate=""/>
                                </reqTypeInstall>

<reqTypeDateExtend>
                                    <rspTypeSubgroupSet
ExpiryDate="" SubGroup="1025"/>
                                </reqTypeDateExtend>

<reqTypeWindBackFix>
                                    <rspTypeWindbackFix/>
                                    <rspTypeSubgroupSet
ExpiryDate="" SubGroup="1025"/>
                                </reqTypeWindBackFix>

<reqTypeEnableSubgroupLow>
                                    <rspTypeSubgroupSet
ExpiryDate="" SubGroup="1025"/>
                                </reqTypeEnableSubgroupLow>

<reqTypeEnableSubgroup>
                                    <rspTypeSubgroupSet
ExpiryDate="" SubGroup="1025"/>
                                </reqTypeEnableSubgroup>

<reqTypeEnableSubgroupA>
                                    <rspTypeSubgroupSet
ExpiryDate="" SubGroup="1025"/>
                                </reqTypeEnableSubgroupA>

<reqTypeLicenceGenericFix>
<rspTypeLicenceGenericFix/>
                                    <rspTypeSubgroupSet
ExpiryDate="" SubGroup="1025"/>
                                </reqTypeLicenceGenericFix>

<reqTypeLicenceRepair>
```

```
<rspTypeLicenceRepair/>
                                              <rspTypeSubgroupSet
   ExpiryDate="" SubGroup="1025"/>
                                              </reqTypeLicenceRepair>
                               </cdilla>
                           </keyserver>

<source.country country.code="GB">
      <!-- (deliver.country+ )-->
   <deliver.country country.code="AF" sale.allowed="yes"
tax.code="T6">
      </deliver.country>
      <deliver.country country.code="AL" sale.allowed="yes"
tax.code="T6">
     </deliver.country>
     <deliver.country country.code="DZ" sale.allowed="yes"
tax.code="T6">
     </deliver.country>
     <deliver.country country.code="AS" sale.allowed="yes"
tax.code="T6">
     </deliver.country>
     <deliver.country country.code="AD" sale.allowed="yes"
tax.code="T6">
  .
  . (List of ISO countries)
  .
   <deliver.country country.code="ZW" sale.allowed="yes"
tax.code="T6">
   </deliver.country>
</source.country></skutype>
        </sku>
```

APPENDIX 3

STORES.XML

```
<store name="PHOCIS" country="GB" password="" database="" username=""
    merchant="NETBANX" proclistid="https://authorit-
    e.webgenerics.com/scripts/pay_rtu.dll" currency="GBP"
    resellerid="100000010">
        <product sku="M33-000822-03">
        <!-- (skutype+ )-->

<skutype skutype="Full" rtuprocessid="21"
    startorderxml="m33NetBanxstart..xml"
    confirmorderxml="m33NetBanxconfirm.xml"
    acceptxml="m33NetBanxaccept.xml" rejectxml="m33reject.xml"
    expiredxml="m33expired.xml" errorxml="m33error.xml"
    startorderhtml="authoritestartorder.htm"
    confirmorderhtml="authoriteconfirmorder.htm"
    accepthtml="authoriteaccept.htm" rejecthtml="authoritereject.htm"
    expiredhtml="authoriteexpired.htm" errorhtml="authoriteerror.htm"
    description="Mr Scruff: Camel's Foot" price="0.33">
        </skutype></product>
</store>
```

APPENDIX 4

SECUREHEADER.XML

```xml
<?xml version="1.0"?><ph-secure-header lastupdated="2000/08/02
14:33:12">
   <version major="0" minor="1" release="2" build="0"/>
   <content-streams>
      <stream format="pdfobj" id="1000007961">
         <pdfobj name="Phoc_SelNetFileData"/>
         <filename ext=".pdf" name="Secure Document"/>
         <authorisation>
            <auth.auto>
               <url protocol="https" domain="authorit-e.webgenerics.com"
page="scripts/license.dll"/>
               <senddata type="urlparams">
                  <urlparams>
                     <urlparam name="Var_Bob_Id"/>
                  </urlparams>
               </senddata>
            </auth.auto>
         </authorisation>
         <encryption encrypted="yes">
            <technology type="cdilla">
               <cdilla>
                  <cdilla.licence hexno="B0026000" subgroup="1084">
                     <cdilla.windback secs-max="54000"/>
                  </cdilla.licence>
                  <cdilla.security-configs appbound="yes">
                     <cdilla.config>
                        <cdilla.trusted-app exe="AcroRd32.exe" title="Acrobat
Reader" version="3.01" index="1">
                           <checksum alg="crc32" imp="st"
decvalue="2880571990"/>
                           <url protocol="file" domain="joven"
page="projects/323 - Phocis - Authorit-e Publisher/Resources/Trusted
Apps/acrobat_reader/3.01/2"/>
                        </cdilla.trusted-app>
                        <cdilla.trusted-app exe="AcroRd32.exe" title="Acrobat
Reader" version="3.01" index="2">
                           <checksum alg="crc32" imp="st"
decvalue="4207061420"/>
                           <url protocol="file" domain="joven"
page="projects/323 - Phocis - Authorit-e Publisher/Resources/Trusted
Apps/acrobat_reader/3.01/3"/>
                        </cdilla.trusted-app>
                        <cdilla.trusted-app exe="AcroRd32.exe" title="Acrobat
Reader" version="3.01" index="3">
                           <checksum alg="crc32" imp="st"
decvalue="2175518580"/>
                           <url protocol="file" domain="joven"
page="projects/323 - Phocis - Authorit-e Publisher/Resources/Trusted
Apps/acrobat_reader/3.01/1"/>
                        </cdilla.trusted-app>
                        <cdilla.trusted-app exe="AcroRd32.exe" title="Acrobat
Reader" version="3.02" index="4">
                           <checksum alg="crc32" imp="st"
decvalue="3213589623"/>
```

```
                    <url protocol="file" domain="joven"
page="projects/323 - Phocis - Authorit-e Publisher/Resources/Trusted
Apps/acrobat_reader/3.02/1"/>
                </cdilla.trusted-app>
                <cdilla.trusted-app exe="AcroRd32.exe" title="Acrobat
Reader" version="4.00 0318" index="5">
                    <checksum alg="crc32" imp="st"
decvalue="2455832051"/>
                    <url protocol="file" domain="joven"
page="projects/323 - Phocis - Authorit-e Publisher/Resources/Trusted
Apps/acrobat_reader/4.00_0318"/>
                </cdilla.trusted-app>
                <cdilla.trusted-app exe="AcroRd32.exe" title="Acrobat
Reader" version="4.00 0513" index="6">
                    <checksum alg="crc32" imp="st"
decvalue="2265676684"/>
                    <url protocol="file" domain="joven"
page="projects/323 - Phocis - Authorit-e Publisher/Resources/Trusted
Apps/acrobat_reader/4.00_0513"/>
                </cdilla.trusted-app>
                <cdilla.trusted-app exe="AcroRd32.exe" title="Acrobat
Reader" version="4.05 0823 PRERELEASE" index="7">
                    <checksum alg="crc32" imp="st"
decvalue="3180887940"/>
                    <url protocol="file" domain="joven"
page="projects/323 - Phocis - Authorit-e Publisher/Resources/Trusted
Apps/acrobat_reader/4.05_0823_PRE"/>
                </cdilla.trusted-app>
                <cdilla.trusted-app exe="AcroRd32.exe" title="Acrobat
Reader" version="4.05 1103" index="8">
                    <checksum alg="crc32" imp="st"
decvalue="4243365223"/>
                    <url protocol="file" domain="joven"
page="projects/323 - Phocis - Authorit-e Publisher/Resources/Trusted
Apps/acrobat_reader/4.05_1103"/>
                </cdilla.trusted-app>
                <cdilla.trusted-app exe="AcroRd32.exe" title="Acrobat
Reader" version="4.05a 1215" index="9">
                    <checksum alg="crc32" imp="st"
decvalue="3292561044"/>
                    <url protocol="file" domain="joven"
page="projects/323 - Phocis - Authorit-e Publisher/Resources/Trusted
Apps/acrobat_reader/4.05a_1215"/>
                </cdilla.trusted-app>
                <cdilla.trusted-app exe="AcroRd32.exe" title="Acrobat
Reader" version="4.05b 0127" index="10">
                    <checksum alg="crc32" imp="st"
decvalue="1640291763"/>
                    <url protocol="file" domain="joven"
page="projects/323 - Phocis - Authorit-e Publisher/Resources/Trusted
Apps/acrobat_reader/4.05b_0127"/>
                </cdilla.trusted-app>

<cdilla.hexconf><![CDATA[BCEF87B5B11E78210500AA680015C886ADA49401
            0200110004007FF184137F614754C737E0B0397A
            7FF5E65E41B5911FDB5E39F6E070DDD13FA7838F
            A8D45E61B1C751BE05ACEE7126D20BA2D5C2EB85
            0435780E151A805BAA03D4195DBC9303410B1FF0
            3E630E28B22D7513AAD238AEF831E25D7A221477
            10DE69C0E69001E60395D2543FB3B36192B4150A
            08A5FB0826F4FBF0A391B1226153A24CA16FEDAD
```

```
DF64F0219E3479A19C43F0C82B596A1A64A977B6
9EEC561E749D902A60652575F77F94375DB75564
037C064EE6A530A59359E6AFAF3C0A68DBF85400
EA1FE0BA60A2CF3A8D45E1642CCD639C31201982
440F6970592AEBF8D492778FA6D05FF8BFAF31F4
C24CEA89828E2BA567D4C19EB554540B443F3665
3390A1E28B1AF1640C9182C3DEE9342C8B0FB2BD
BD1F466B29Q5D5DA7241E7B40DEB2AE8404384FA
7CCE8DF4CAE1C24C03838BFACF21099BE67874F8
17BF9F96C1E3924A4F477564FB20D13BE77870B4
8EC3E059FD608072C7863CEA398935956B04C374
EFB0DE90486D8DA61DBBA453C903C91512B6567F
1534CA27
]]></cdilla.hexconf>
          </cdilla.config>
        </cdilla.security-configs>
        <cdilla.min-rts-ver major="3" minor="10" build="079"/>
      </cdilla>
    </technology>
  </encryption>
  <content mimetype="application/pdf">
    <metadata source="document">
      <Argument name="part-number" value="PHO-012346" displayname="Part Number"/>
      <Argument name="title" value="Stephen King" displayname="Title"/>
      <Argument name="artist" value="Al" displayname="Author"/>
      <Argument name="publisher" value="Phocis Ltd" displayname="Publisher"/>
      <Argument name="publish-date" value="August 2000" displayname="Publication Date"/>
      <Argument name="standard-resource-code" value="GB-PHO-98766" displayname="Document Object Identifier"/>
    </metadata>

<!-- Set the permitted print operations & disabled printers here -->
    <mimetype-specific>
      <application_pdf>

<!-- Specify Acrobat security handler applied to secure content PDF.
              You must save your source document with the Acrobat Standard
              security handler (with "No Print" set) and password protect it
              BEFORE you encrypt it. -->
        <security handler="standard">
          <!-- Password required to modify PDF security settings. -->
          <password target="security-options">ThePDFPassword</password>
        </security>

<!-- Print operations & printers -->
        <printing enabled="yes">              <!-- Set whether printing is permitted at all -->
          <print-to-file enabled="no"/>       <!-- Enable/disbale "print to file" -->
          <print-range>
```

```
                <pages-all enabled="yes"/>       <!-- Allow printing
of entire document -->
                <pages-current enabled="yes"/>   <!-- Allow printing
of current page -->
                <pages-range enabled="yes"/>     <!-- Allow printing
of a user-specified page range -->
              </print-range>
              <printers>                         <!-- Specify each
printer to disable -->
                <printer enabled="no">           <!-- 1st disabled
printer -->
                  <name>Acrobat Distiller</name>
                </printer>
                <printer enabled="no">           <!-- 2nd disabled
printer -->
                  <name>Acrobat PDFWriter</name>
                </printer>
              </printers>
              <overprint>
                <!-- "config" contains a structure formatted like
DSTAMP.INI for the Date Stamp plug-in -->
                <config>
<![CDATA[
[options]
font=Arial
psfont=Helvetica
size=8
[stamp0]
format=ne,r
text0=Page $page$ of $pages$
[stamp1]
format=nw,1
text0=Printed on: $date$ $time$
text1=Stephen King print
[stamp2]
format=sw,1
text0=www.authorit-e.com
]]>
                </config>
              </overprint>
            </printing>
          </application_pdf>
        </mimetype-specific>

</content>

<!-- Set up the meter info here. You should only include one
meter element with
         attribute value default="yes". -->
    <meters>

<!-- Meter ID 0 meters the total number of permitted print
operations -->
      <meter meter.id="0" default="yes" incrementable="yes"
decrementable="yes">
        <name>Prints Meter</name>
        <desc>Printing of this document is restricted to a set
total number of prints.</desc>
        <unit unit.id="0">
          <desc>prints</desc>
```

```
            </unit>
            <init-credits>5</init-credits>
         </meter>

<!-- Meter ID 1 meters the total number of pages which can be
printed -->
         <!--
         <meter meter.id="0" default="yes" incrementable="yes"
decrementable="yes">
            <name>Pages Meter</name>
            <desc>Printing of this document is restricted to a set
total number of pages.</desc>
            <unit unit.id="2">
               <desc>pages</desc>
            </unit>
            <init-credits>7</init-credits>
         </meter>
         -->

<!-- Meter ID 2 meters the printing by number of days -->
         <!--
         <meter meter.id="0" default="yes" incrementable="yes"
decrementable="no">
            <name>Time Meter</name>
            <desc>Printing of this document is restricted to a set
number of days.</desc>
            <unit unit.id="1">
               <desc>days</desc>
            </unit>
            <init-credits>5</init-credits>
         </meter>
         -->

</meters>

<gui>
         <gui.skin format="dfm-text">
            <dfm-text storage="zipped-file">
               <zipped-file internal-path="JobItem0\SkinFile\skin.txt"/>
            </dfm-text>
         </gui.skin>
         <gui.cover format="html-data">
            <html-data storage="zipped-file">
               <zipped-file internal-path="JobItem0\CoverFile\skin.htm">
                  <link-data storage="zip"/>
               </zipped-file>
            </html-data>
         </gui.cover>
         <gui.storage type="zip">
            <zip source="raw" encoding="mime-base64"><![CDATA[
--StMime-00008F84-000017B0-000324AC-F03D
Content-Type: multipart/mixed; name="guizip"
Content-Transfer-Encoding: base64
Content-Description: guizip
Content-Disposition: attachment; filename="guizip"

UEsDBBQAAAAIACZ0AimebsFYMF0AACgwDgAaAAAASm9iSXRlbTAvU2tpbkZp
bGUvc....(ASCII representation of the GUI skin and HTML cover)

--StMime-00008F84-000017B0-000324AC-F03D--
```

```
     ]]></zip>
          </gui.storage>
        </gui>
      </stream>
    </content-streams>
  </ph-secure-header>
```

APPENDIX 5

SERVICES SPECIFICATION.XML

```
<?xml version="1.0"?>
<adrml-publishservices>

<!-- version ARGUMENT -->
    <version major="0" minor="1" release="0" build="0" modified="2000-
05-30T15:56:00"/>

<!-- BEGIN LicenceService ARGUMENT -->
    <LicenceService description="License Service" datatype="select"
defaultvalue="1" minpermitted="1" maxpermitted="1">

<SelectItem value="1" description="Authorisation via NetBanx
payment bureau">
            <Argument name="price" description="Price" datatype="currency"
minvalue="0.50" maxvalue="9999.0" minpermitted="1" maxpermitted="1"/>
            <Argument name="currency" description="Currency"
datatype="select" defaultvalue="GBP" minpermitted="1"
maxpermitted="1">
                <SelectItem value="GBP" description="Pounds Sterling (GBP)"/>
            </Argument>
            <Argument name="processxml" description="Authorisation process
type" datatype="select" defaultvalue="1" minpermitted="1"
maxpermitted="1">
                <SelectItem value="1" description="NetBanx Authorisation #1">
                    <Argument name="export" description="Permitted export
regions" datatype="select" defaultvalue="1" minpermitted="1"
maxpermitted="1">
                        <SelectItem value="1" description="Exportable to entire
world (no restrictions)"/>
                    </Argument>
                </SelectItem>
            </Argument>
            <Argument name="rtu-processor-url" description="Payment
processor URL" datatype="string" minlength="8" maxlength="255"
minpermitted="1" maxpermitted="1"/>
        </SelectItem>

<SelectItem value="2" description="Authorisation via ePDQ payment
bureau">
            <Argument name="price" description="Price" datatype="currency"
minvalue="0.50" maxvalue="9999.0" minpermitted="1" maxpermitted="1"/>
            <Argument name="currency" description="Currency"
datatype="select" defaultvalue="GBP" minpermitted="1"
maxpermitted="1">
                <SelectItem value="GBP" description="Pounds Sterling (GBP)"/>
            </Argument>
            <Argument name="processxml" description="Authorisation process
type" datatype="select" defaultvalue="1" minpermitted="1"
maxpermitted="1">
                <SelectItem value="2" description="ePDQ Authorisation #1">
                    <Argument name="export" description="Permitted export
regions" datatype="select" defaultvalue="1" minpermitted="1"
maxpermitted="1">
                        <SelectItem value="1" description="Exportable to entire
world (no restrictions)"/>
```

```
            </Argument>
          </SelectItem>
        </Argument>
        <Argument name="epdq-cybercash-id" description="Cybercash ID"
 datatype="string" defaultvalue="" minpermitted="1" maxpermitted="1"
 />
        <Argument name="epdq-hash-secret" description="Cybercash Hash
 Secret" datatype="string" defaultvalue="" minpermitted="1"
 maxpermitted="1"/>
        <Argument name="epdq-merchant-key" description="Cybercash
 Merchant Key" datatype="string" defaultvalue="" minpermitted="1"
 maxpermitted="1"/>
        <Argument name="epdq-msw-accepts" description="Accepted Cards"
 datatype="string" defaultvalue="" minpermitted="1" maxpermitted="1"/>
      </SelectItem>

</LicenceService>
    <!-- END LicenceService ARGUMENT -->

<!-- BEGIN MimeType ARGUMENT -->
    <MimeType description="MIME types" datatype="select"
 minpermitted="1" maxpermitted="1">

<SelectItem value="application/pdf" Description="Adobe PDF
 document">
        <Argument name="title" description="Document Title"
 datatype="string" minlength="1" maxlength="80" minpermitted="1"
 maxpermitted="1"/>
        <Argument name="artist" description="Author(s)"
 datatype="string" defaultvalue="" minlength="0" maxlength="255"
 minpermitted="0" maxpermitted="1"/>
        <Argument name="editor" description="Editor(s)"
 datatype="string" defaultvalue="" minlength="0" maxlength="255"
 minpermitted="0" maxpermitted="1"/>
        <Argument name="publisher" description="Publisher"
 datatype="string" defaultvalue="" minlength="0" maxlength="40"
 minpermitted="0" maxpermitted="1"/>
        <Argument name="publish-date" description="Publication Date"
 datatype="string" defaultvalue="" minlength="0" maxlength="30"
 minpermitted="0" maxpermitted="1"/>
        <Argument name="part-number" description="Part Number"
 datatype="string" defaultvalue="" minlength="0" maxlength="20"
 minpermitted="1" maxpermitted="1"/>
        <Argument name="standard-resource-code" description="Document
 Object Identifier" datatype="string" defaultvalue="" minlength="0"
 maxlength="40" minpermitted="0" maxpermitted="1"/>

<Argument name="trusted-app-combo" description="Trusted Reader
 Application Combination" datatype="select" defaultvalue="1"
 minpermitted="1" maxpermitted="1">
          <SelectItem value="1" description="Acrobat Reader (4.05 1103,
 4.05a 1215, 4.05b 0127)"/>
        </Argument>
      </SelectItem>

<SelectItem value="audio/x-mpeg" Description="MP3 audio file">
        <Argument name="title" description="Song Title"
 datatype="string" minlength="1" maxlength="80" minpermitted="1"
 maxpermitted="1"/>
```

```
        <Argument name="artist" description="Artist" datatype="string"
defaultvalue="" minlength="0" maxlength="255" minpermitted="0"
maxpermitted="1"/>
        <Argument name="author" description="Composer"
datatype="string" defaultvalue="" minlength="0" maxlength="255"
minpermitted="0" maxpermitted="1"/>
        <Argument name="publisher" description="Publisher"
datatype="string" defaultvalue="" minlength="0" maxlength="40"
minpermitted="0" maxpermitted="1"/>
        <Argument name="publish-date" description="Publication Date"
datatype="string" defaultvalue="" minlength="0" maxlength="30"
minpermitted="0" maxpermitted="1"/>
        <Argument name="part-number" description="Part Number"
datatype="string" defaultvalue="" minlength="0" maxlength="20"
minpermitted="1" maxpermitted="1"/>
        <Argument name="standard-resource-code" description="ISRC
Number" datatype="string" defaultvalue="" minlength="0"
maxlength="40" minpermitted="0" maxpermitted="1"/>

<Argument name="trusted-app-combo" description="Trusted Player
Application Combination" datatype="select" defaultvalue="2"
minpermitted="1" maxpermitted="1">
            <SelectItem value="2" description="FreeAmp (2.0.7); Destiny
Media Player (1.34)"/>
        </Argument>
    </SelectItem>

<SelectItem value="audio/x-ms-wma" Description="Windows Media
audio file">
        <Argument name="title" description="Song Title"
datatype="string" minlength="1" maxlength="80" minpermitted="1"
maxpermitted="1"/>
        <Argument name="artist" description="Artist" datatype="string"
defaultvalue="" minlength="0" maxlength="255" minpermitted="0"
maxpermitted="1"/>
        <Argument name="author" description="Composer"
datatype="string" defaultvalue="" minlength="0" maxlength="255"
minpermitted="0" maxpermitted="1"/>
        <Argument name="publisher" description="Publisher"
datatype="string" defaultvalue="" minlength="0" maxlength="40"
minpermitted="0" maxpermitted="1"/>
        <Argument name="publish-date" description="Publication Date"
datatype="string" defaultvalue="" minlength="0" maxlength="30"
minpermitted="0" maxpermitted="1"/>
        <Argument name="part-number" description="Part Number"
datatype="string" defaultvalue="" minlength="0" maxlength="20"
minpermitted="1" maxpermitted="1"/>
        <Argument name="standard-resource-code" description="ISRC
Number" datatype="string" defaultvalue="" minlength="0"
maxlength="40" minpermitted="0" maxpermitted="1"/>

<Argument name="trusted-app-combo" description="Trusted Player
Application Combination" datatype="select" defaultvalue="3"
minpermitted="1" maxpermitted="1">
            <SelectItem value="3" description="Windows Media Player
(7.00.00.1954)"/>
        </Argument>
    </SelectItem>

<!-- application/smil files typically have .smi or .smil extensions
-->
```

```xml
<SelectItem value="application/smil" Description="RealMedia smil file">
    <Argument name="title" description="Title" datatype="string" minlength="1" maxlength="80" minpermitted="1" maxpermitted="1"/>
    <Argument name="artist" description="Artist" datatype="string" defaultvalue="" minlength="0" maxlength="255" minpermitted="0" maxpermitted="1"/>
    <Argument name="author" description="Composer" datatype="string" defaultvalue="" minlength="0" maxlength="255" minpermitted="0" maxpermitted="1"/>
    <Argument name="publisher" description="Publisher" datatype="string" defaultvalue="" minlength="0" maxlength="40" minpermitted="0" maxpermitted="1"/>
    <Argument name="publish-date" description="Publication Date" datatype="string" defaultvalue="" minlength="0" maxlength="30" minpermitted="0" maxpermitted="1"/>
    <Argument name="part-number" description="Part Number" datatype="string" defaultvalue="" minlength="0" maxlength="20" minpermitted="1" maxpermitted="1"/>
    <Argument name="standard-resource-code" description="ISRC Number" datatype="string" defaultvalue="" minlength="0" maxlength="40" minpermitted="0" maxpermitted="1"/>

<Argument name="trusted-app-combo" description="Trusted Player Application Combination" datatype="select" defaultvalue="4" minpermitted="1" maxpermitted="1">
        <SelectItem value="4" description="RealPlayer 8 Plus (6.0.9.230)"/>
    </Argument>
</SelectItem>

<!-- application/vnd.rn-realmedia files typically have .rm extensions -->
<SelectItem value="application/vnd.rn-realmedia" Description="RealMedia file">
    <Argument name="title" description="Title" datatype="string" minlength="1" maxlength="80" minpermitted="1" maxpermitted="1"/>
    <Argument name="artist" description="Artist" datatype="string" defaultvalue="" minlength="0" maxlength="255" minpermitted="0" maxpermitted="1"/>
    <Argument name="author" description="Composer" datatype="string" defaultvalue="" minlength="0" maxlength="255" minpermitted="0" maxpermitted="1"/>
    <Argument name="publisher" description="Publisher" datatype="string" defaultvalue="" minlength="0" maxlength="40" minpermitted="0" maxpermitted="1"/>
    <Argument name="publish-date" description="Publication Date" datatype="string" defaultvalue="" minlength="0" maxlength="30" minpermitted="0" maxpermitted="1"/>
    <Argument name="part-number" description="Part Number" datatype="string" defaultvalue="" minlength="0" maxlength="20" minpermitted="1" maxpermitted="1"/>
    <Argument name="standard-resource-code" description="ISRC Number" datatype="string" defaultvalue="" minlength="0" maxlength="40" minpermitted="0" maxpermitted="1"/>

<Argument name="trusted-app-combo" description="Trusted Player Application Combination" datatype="select" defaultvalue="4" minpermitted="1" maxpermitted="1">
        <SelectItem value="4" description="RealPlayer 8 Plus (6.0.9.230)"/>
```

```
            </Argument>
          </SelectItem>

<!-- video/quicktime files typically have .mov extensions -->
          <SelectItem value="video/quicktime" Description="QuickTime
   movie">
            <Argument name="title" description="Title" datatype="string"
   minlength="1" maxlength="80" minpermitted="1" maxpermitted="1"/>
            <Argument name="artist" description="Artist" datatype="string"
   defaultvalue="" minlength="0" maxlength="255" minpermitted="0"
   maxpermitted="1"/>
            <Argument name="author" description="Composer"
   datatype="string" defaultvalue="" minlength="0" maxlength="255"
   minpermitted="0" maxpermitted="1"/>
            <Argument name="publisher" description="Publisher"
   datatype="string" defaultvalue="" minlength="0" maxlength="40"
   minpermitted="0" maxpermitted="1"/>
            <Argument name="publish-date" description="Publication Date"
   datatype="string" defaultvalue="" minlength="0" maxlength="30"
   minpermitted="0" maxpermitted="1"/>
            <Argument name="part-number" description="Part Number"
   datatype="string" defaultvalue="" minlength="0" maxlength="20"
   minpermitted="1" maxpermitted="1"/>
            <Argument name="standard-resource-code" description="ISRC
   Number" datatype="string" defaultvalue="" minlength="0"
   maxlength="40" minpermitted="0" maxpermitted="1"/>.

<Argument name="trusted-app-combo" description="Trusted Player
   Application Combination" datatype="select" defaultvalue="5"
   minpermitted="1" maxpermitted="1">
              <SelectItem value="5" description="QuickTime 4.1.2"/>
            </Argument>
          </SelectItem>

</MimeType>
      <!-- END MimeType ARGUMENT -->

<!-- BEGIN LicenceTerms ARGUMENT -->
      <LicenceTerms description="Content Protection Mechanism"
   datatype="select" defaultvalue="1" minpermitted="1" maxpermitted="1">

<SelectItem value="1" description="C-Dilla security">
          <Argument name="triallable" description="Preview Period"
   datatype="select" defaultvalue="0" minvalue="0" maxvalue="1"
   minpermitted="1" maxpermitted="1">
            <SelectItem value="0" description="Disabled"/>
            <SelectItem value="1" description="Enabled">
              <Argument name="trial-period" description="Preview period
   in days (NB: '0' = until midnight on the current day)"
   datatype="integer" defaultvalue="0" minvalue="0" maxvalue="65535"
   minpermitted="1" maxpermitted="1"/>
            </SelectItem>
          </Argument>
          <Argument name="trusted-app-download-url" description="Trusted
   application base download URL" datatype="string" defaultvalue=""
   minlength="1" maxlength="255" minpermitted="1" maxpermitted="1"/>
        </SelectItem>

</LicenceTerms>
      <!-- END LicenceTerms ARGUMENT -->
```

```
</adrml-publishservices>
```

APPENDIX 6

STANDARDHEADER.XML

```
<?xml version="1.0" encoding="UTF-8"?><ph-std-header
modified="2000/06/22 21:04:32">
    <version major="0" minor="1" release="0" build="0"/>
    <acrobat>
      <acrobat.pi>
        <min-ver major="1" minor="1" release="7" build="23"/>
      </acrobat.pi>
    </acrobat>
    <sh secure="yes">
      <enc type="cdilla">
        <cDilla licence.hexno="B0026000">
              <cdilla.min-rts-ver major="3" minor="10" build="079"/>
        </cdilla>
      </enc>
    </sh>
</ph-std-header>
```

APPENDIX 7

RTU.XML

```
    <adrml-rtu-request >
    <version major="0" minor="1" release="0" build="0" modified="1999-12-
    13"/>
            <processor name="beenz">
                    <send protocol="http" url="java.beenz.com/cgi-
    bin/remote_redemption_txn.pl" contenttype="application/x-www-form-
    urlencoded" method="post">
                                <!-- (parameter-block+ )-->
                                <urlparams>
                                        <parameters name="redemption">
                                                <!-- (parameter )+-->
                                                <parameter name="Version"
    pname="pver" internal="None" value="0.01" datatype="string"
    required="yes">
                                                        <string minlength="1"
    maxlength="50"/>
                                                </parameter>
                                                <parameter name="Redemption
    ID" pname="redid" internal="Var_Pay_RedemptionID" value="23553"
    datatype="integer" required="yes">
                                                        <integer min="10000"
    max="99999"/>
                                                </parameter>
            <parameter name="Transaction type" pname="type"
    internal="Var_Pay_TransType" value="AUTH_CLEAR" datatype="select"
    required="yes">
            <select>
              <item value="AUTH_ONLY" name="Authorise only"/>
              <item value="AUTH_CLEAR" name="Authorise and clear"/>
            </select>
                                                </parameter>
                                                <parameter name="Partner
    code" pname="pcode" internal="Var_Pay_PartnerID" value="BNZS"
    datatype="string" required="yes">
                                                        <string minlength="4"
    maxlength="10"/>
                                                </parameter>
                                                <parameter name="Arguments"
    pname="args" encoded="yes" required="yes">
                                                        <encoding
    type="padblock">
                                                        <padblock blocksize="8" side="right"
    padchar=" "/>
                                                        </encoding>
                                                        <encoding
    type="blowfish">
                                                        <blowfish mode="ECB" key="BEENZCOMTESTKEY"/>
                                                        </encoding>
                                                        <encoding
    type="strtohex">
                                                        <strtohex/>
                                                        </encoding>
                                                        <encoding
```

```
                type="discard">
                                            <discard
        side="right" nochars="16"/>
                                          </encoding>
                                          <parameters
    name="beenzuser">
                                            <!--
    (parameter )+-->
                                            <parameter
    name="e-mail" pname="email" internal="Var_Postal_Email"
    value="#Var_Postal_Email#" datatype="email" required="yes"/>
                                            <parameter
    name="Password" pname="pwd" internal="Var_Postal_Password"
    value="#Var_Postal_Password#" datatype="string" required="yes">
        <string minlength="1" maxlength="50"/>
                                          </parameter>
                                            <parameter
    name="Number of beenz" pname="value" internal="Var_Price_Gross"
    value="#Var_Price_Gross#" datatype="float" required="yes">
                <float min="0" max="999999" decimalplaces="0"/>
                                          </parameter>
                                            <!--
    (preprocessing )-->
                                          </parameters>
                                        </parameter>
                                      </parameters>
                                    </urlparams>
                                    <postdata>
                        <![CDATA[This is where an XML
    document would go.]]>
                                    </postdata>
                            </send>
        <receive>

<returnparameters name="beenz" type="delimited">
            <delimited delimiter="
"/>
                <returnparameter name="First section" pname="section1"
    internal="none" datatype="string" required="yes">
            <returnparameters name="beenz" type="delimited">
            <delimited delimiter=","/>
                <returnparameter name="Return code" pname="returncode"
    internal="Var_Pay_ReturnCode" datatype="string" required="yes"
    encoded="yes">
            <encoding type="map">
                <map name="returncodemap" defaultmapto="206"
    maprequired="yes">
                    <mapitem mapfrom="0" mapto="206"/>
                    <mapitem mapfrom="1" mapto="0"/>
                </map>
            </encoding>
            </returnparameter>

<returnparameter name="Error code" pname="errorcode"
    internal="Var_Pay_ErrorCode" datatype="integer" required="yes"
    encoded="yes">
                <encoding type="map">
                   <map name="errorcodemap" defaultmapto="0">
                        <mapitem mapfrom="PASSWORD_ERROR" mapto="602"/>
                        <mapitem mapfrom="NO_USER_FOR_EMAIL" mapto="601"/>
                        <mapitem mapfrom="USER_HASNT_GOT_ENOUGH_BEENZ"
```

```
mapto="603"/>
            <mapitem mapfrom="REDEMPTION_NOT_FOUND" mapto="600"/>
            <mapitem mapfrom="PARTNER_NOT_FOUND" mapto="600"/>
            <mapitem mapfrom="NOT_REDEMPTION_OWNER" mapto="600"/>
            <mapitem mapfrom="BAD_ARGUMENTS" mapto="600"/>
            <mapitem mapfrom="BAD_ENCRYPTED_ARGUMENTS" mapto="600"/>
            <mapitem mapfrom="MAJOR_PROTOCOL_MISMATCH" mapto="600"/>
            <mapitem mapfrom="INTERNAL_FAILURE" mapto="600"/>
          </map>
        </encoding>
      </returnparameter>
      <returnparameter name="Transaction reference"
pname="reference" internal="Var_Pay_Ref" datatype="string">
      </returnparameter>
    </returnparameters>
      </returnparameter>
      <returnparameter name="Dummy" pname="dummy" internal="none"
datatype="string" >
      </returnparameter>

</returnparameters>

</receive>
    </processor>
</adrml-rtu-request>
```

Appendix 8

An example of an unencrypted version of the first encrypted data of the data entity

```xml
<?xml version="1.0" encoding="UTF-8"?>
<ph-secure-header lastupdated="2001/09/12 16/33/50">
   <version major="0" minor="1" release="2" build="0" />
   <content-streams>
      <stream format="pdfobj" id="AAAA0001-1182092887-0">
         <pdfobj name="Phoc_SelNetFileData" />
         <filename name="Content" ext="xls" />
         <authorisation>
            <auth.auto>
               <url protocol="https"
                    domain="sdx.phocis.com" page="license" />
               <senddata type="urlparams">
                  <urlparams>
                     <urlparam name="Var_Bob_Id" />
                  </urlparams>
               </senddata>
            </auth.auto>
            <repeat-on-each-open value="yes" />
         </authorisation>
         <encryption encrypted="yes">
            <technology type="cdilla">
               <cdilla>
                  <cdilla.licence hexno="B0026000" subgroup="1496">
                     <cdilla.windback secs-max="54000" />
                     <cdilla.bob-life embargo="2001/09/12" />
                  </cdilla.licence>
                  <cdilla.security-configs appbound="yes">
                     <cdilla.config>
                        <cdilla.trusted-app exe="AppOne.exe"
                             title="Trusted application 1"
                             version="1.1.0" index="1">
                           <checksum alg="crc32" imp="st"
                                decvalue="932475835" />
                        </cdilla.trusted-app>
                        <cdilla.trusted-app exe="AppTwo.exe"
                             title="Trusted application 2"
                             version="2.31.2" index="2">
                           <checksum alg="crc32" imp="st"
                                decvalue="4839502473" />
                        </cdilla.trusted-app>
                        <cdilla.hexconf>
<![CDATA[BCEF87B5B11E78210500FADC1A7B95F55ECB9C01
03000C00590030A053B45523F1B3FE07D0B81A20
D62A6DB49093EDCD0841418EF86F145D73702BD3
703290B72E287F686966D646B5816384DDD55ABA
C387DFC80E5B892F8213D9008944647CD1D60DFB
9D46DD29AB735C3E055F00EE6ADDD855BBE75A02
69081537C9F329E4B5011D797B3603D5AD954A67
FF18E7C6DE4C48E198570FCE04B055112E124905
A4372F3C1854BCFF1C72D2B3EC00F54F906EFC25
D1924B92E4FEE75AA61B0708D37D17DD50634D22
26CB145B8BCE8B413658438CEB9B979D0679B3CC
3F2E020AC6C9297D0D6B231E9B7A28DD2AFEC8A0
AEBF7F3BB9023D9797F755874AC7FCCF4F71F40D
BAA95DD67B118542398F3316C0A60B540FC48E7F
CB68023406F25A075C064163D2A9786A0E6E80D3
```

```
          C02BFD6B6F37146D06C6EE477C21B03E9930F0E9
          2941C8A76B07276CF5D933BB9D46C9DFBF85EC4C
          09C3BE10338F63646EEACCA476725A9CA847669E
          9D716CC5B7E2B16BFF6B67E013181F7F06FBE8C1
          DE505288DE408D24A6B4CFFBC4A03EB511D24044
          C57BF25EEEB8DCC3A79A56EC}]>
                    </cdilla.hexconf>
                  </cdilla.config>
                </cdilla.security-configs>
                <cdilla.min-rts-ver major="3" minor="10" build="89" />
              </cdilla>
            </technology>
          </encryption>
          <content mimetype="application/vnd.ms-excel">
            <metadata>
              <Argument name="title" value="Phocis"
                    displayname="Title" />
            </metadata>
          </content>
          <gui>
            <gui.skin format="dfm-text">
              <dfm-text storage="zipped-file">
                <zipped-file internal-path="skin.txt" />
              </dfm-text>
            </gui.skin>
            <gui.cover format="html-data">
              <html-data storage="zipped-file">
                <zipped-file internal-path="cover.html">
                  <link-data storage="zip" />
                </zipped-file>
              </html-data>
            </gui.cover>
            <gui.storage type="zip">
              <zip source="raw" encoding="mime-base64">
    <![CDATA[
    --StMime-00008F16-00000EC3-0A03D6F3-2BD0
    Content-Type: multipart/mixed; name="guizip"
    Content-Transfer-Encoding: base64
    Content-Description: guizip
    Content-Disposition: attachment; filename="guizip"

UEsDBBQACAAIADmELCsAAAAAAAAAAAAAAAARAAAAc2R4MjUxX2NvdmVyLmh0bWydU8tu1TAQXRMp
    /zDygq64D9qCELmRkNiwQyoLWFVOPHFGOHawJ7ctX884D3F5iAWRYnvs43PO2J6yKIuq58HVuUdt
    pH9WMbHD+u79Z22jDGWO1XyYES18xMmyCeYLGtsGFeFIPPTEqcNjxoKM1f1IHBRzGi2gZPpDh/iLu
    kWzPeSILsG4cwoq5vRbUtn57vFZwlo6ssAmxqqHimBsjN10atcz/BoF13KJnjD+5jiL23DdpfCu5
    mVqaWGeysgD5/ovx1SEbosFCiulJ0aAtpnOyj/cu2HB/vDk+vnm9s9SpetbMUrNuTjr+kZjZzuDm
    sG6o8p84Bm/rqgueodMtnpSOpJ2CRN8leKnqd22LKZXFB9+FOGim4Kt9xgvNtr2ZZZZf2H1SfAuiZ
    DZ7CFAFffNTtV8krh+LPOWgQ7EQGDXAfw2T7stCQMBImCB0kxjHJkmY5UC/iDkQ/kLcbsfYGppQ5
    BU6cZpycbdpdmvxyoRfx20QxKwZIUzMQr+4GTQ60MXHj5R5h1Ck9hGhmy70+5/0t0h1NWUzeYBS3
    ...
    ...etc...

4BxKI8tEzj4wx+kioKcYaQQ1NfA8cyQq6TxAKoMfytk5Cs5p/8YRgoMQrEZ3MbiAD1VFs94TnHQx
    +IVgOaZSogVH53DSTwWwkAtOPXtTWkti8MjjEraBnKkuII3zPBEhgMgYZopiDfQVQxDTf54GS2jO
    /+kgeydFApQQ9wrmKse1EGDT/wBQSwcI3MfXiTAVAAB/FQAAUEsBAhQAFAAIAAgAOYQsK0Q13NnK
    AQAAhgMAABEAAAAAAAAAAAAAAAAAAAAAAAHNkeDI1MV9jb3Z1ci5odG1sUEsBAhQAFAAIAAgAOYQs
    K0XPbOkDAAAAAAQAAAAwAAAAAAAAAAAAAAAAAAACQIAAHNkeF9za21uLnR4dFBLAQIUABQACAAIADmE
    LCvcx9eJMBUAAH8VAAAAaAAAAAAAAAAAAAAAAAAEYCAABpbWFnZXMvc2R4X2xvZ29fMTQxLmdp
    Z1BLBQYAAAAAAwADAMEAAAC+FwAAAA=
 60
    --StMime-00008F16-00000EC3-0A03D6F3-2BD0
    ]]>    </zip>
              </gui.storage>
            </gui>
          </stream>
        </content-streams>
      </ph-secure-header>
```

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A data entity comprising first encrypted data decodable only by a first local application located at a first client machine, second encrypted data usable, in decrypted form, by the first application or a second local application, that is one of a specified list of trusted applications, that can be decrypted using authorisation data received from a remote licensing server, located at the first client machine only after the first encrypted data has been decoded, the second encrypted data representing encrypted digital content.

2. A data entity as claimed in claim 1, further comprising a reference to a first remote licensing server for providing an identification of the data entity to the first remote licensing server to instigate in response to providing the identification transmission of the authorisation data from the first remote server to the first client machine to change the license status of the second encrypted data from a first state to a second state.

3. A data entity as claimed in claim 2, in which the authorisation data allows the second encrypted data to be at least decoded and/or output by the second local application at the first client machine.

4. A data entity as claimed in claim 1, in which the second encrypted data comprises at least digital content.

5. A data entity as claimed in claim 4 in which the digital content comprises at least one of textual information, graphical information, moving image information and sound information.

6. A data entity as claimed in claim 1 further comprising the step of performing a licensing process via which authorisation to utilise the second encrypted data can be obtained prior to receiving the authorisation data from the remote licensing server.

7. A data entity as claimed in claim 6 in which licensing data is arranged to perform or control at least one licensing operation.

8. A data entity as claimed in claim 7 in which the licensing data can be dynamically changed at the remote licensing server independently of any manipulation of or operations in relation to the data entity.

9. A data entity as claimed in claim 7 in which the licensing process includes providing payment or payment details to a third party via a second remote server for permission to utilise or decrypt the second encrypted data.

10. A data entity as claimed in claim 1 in which the first or second local application forwards information to the remote licensing server relating to the usage of the data entity.

11. A data entity as claimed in claim 10 in which the usage relates to output of a media file.

12. A data entity as claimed in claim 1 in which the first and/or second local application is at least one of a list of trusted applications, the list being contained within the first encrypted data.

13. A data entity as claimed in claim 1 in which the first encrypted data comprises visual data, for output to a user.

14. A data entity as claimed in claim 1 in which at least one of the first and second encrypted data are XML objects.

15. A data entity as claimed in claim 1 further comprising third data comprising identification data to allow the first local application to identify the version of the publication application used to create the data entity.

16. A data entity as claimed in claim 1 in which the digital content is a reference to further digital content.

17. A data entity as claimed in claim 16 in which the reference is a URL.

18. A data entity as claimed in claim 1 which is substantially free of decryption keys.

19. A data processing method comprising:
receiving a data entity, processing the data entity using a first local application, decrypting first encrypted data, accessing a remote licensing server and receiving authorisation data from the remote licensing server to allow the first application or a second local application to decrypt second encrypted data responsive to the decryption of the first encrypted data;
decrypting the second encrypted data in response to receiving the authorisation data; and
utilising the decrypted second data using the second local application.

20. A data processing method as claimed in claim 19 further comprising: receiving from the remote licensing server instructions or process steps for obtaining access to the second encrypted data.

21. A data processing method as claimed in claim 20 in which the instructions or process steps comprise providing payment or payment details to a third party e-commerce service provider in exchange for access to the second encrypted data to allow payment credits to be made to a third party.

22. A data processing method as claimed in claim 21 further comprising: effecting payment to the third party each time the second encrypted data has been accessed.

23. A data processing method as claimed in claim 22 further comprising: determining the current licensing state of the data entity and contacting the remote licensing server if the current licensing state of the data entity corresponds to an unlicensed state.

24. A data processing method as claimed in claim 19 further comprising: setting conditions subject to which the second encrypted data can be accessed.

25. A data processing method as claimed in claim 24 in which setting conditions comprises at least one of: allowing access to the second encrypted data for a predeterminable period of time and metering the usage of and/or access to second encrypted data.

26. A data processing method as claimed in claim 25 further comprising: requesting payment or payment details upon expiry of the predeterminable period of time in response to an attempt to access the second encrypted data after expiry of the predetermined period of time.

27. A data processing method as claimed in claim 19, further comprising: invoking the data entity; determining that the invocation is not permitted in accordance with a prevailing licensing state; contacting, in response to said determining, a remote licensing server; and performing a licensing operation in relation to the data entity in accordance with a response from the remote licensing server.

28. A data processing method as claimed in claim 27 in which the licensing operation comprising at least one of: changing licensing conditions associated with a current licensing state; and revoking at least one current licensing condition associated with a current licensing state.

29. A data processing method as claimed in claim 19, further comprising: granting licensing conditions to allow access to unpublished material in preparation for said unpublished material being published.

30. A data processing system comprising: means for receiving a data entity; means for processing the data entity using a first local application; means for decrypting first encrypted data; means for accessing a remote licensing server; and means for receiving authorisation data from the remote licensing server to allow the first application or a second local application to decrypt second encrypted data responsive to the decryption of the first encrypted data;
means for decrypting the second encrypted data in response to receiving the authorisation data; and
means for utilising and/or outputting the decrypted second data.

31. A data processing system as claimed in claim 30 further comprising means for receiving from the remote licensing server instructions or process steps for obtaining access to the second encrypted data.

32. A data processing system as claimed in claim 31 in which the instructions or process steps comprise providing payment or payment details to a third party e-commerce service provider server in exchange for access to the second encrypted data to allow payment credits to be made to a third party.

33. A data processing system as claimed in claim 32 further comprising means to effect payment to the third party each time the second encrypted data has been accessed.

34. A data processing system as claimed in claim 33, further comprising means for determining the current licensing state of the data entity; and means for contacting the remote licensing server if the current licensing state of the data entity corresponds to an unlicensed state.

35. A data processing system as claimed in claim 30 further comprising means for setting conditions subject to which the second encrypted data can be accessed.

36. A data processing system as claimed in claim 35 in which the means for setting conditions comprises means for allowing access to the second encrypted data for a predeterminable period of time.

37. A data processing system as claimed in claim 36 further comprising: means for requesting payment or payment details upon expiry of the predeterminable period of time in response to an attempt to access the second encrypted data after expiry of the predetermined period of time.

38. A publishing method for producing a data entity, comprising:
receiving second data to be encrypted together with an encryption key, encrypting the second data to produce second encrypted data;
creating first data comprising at least a list of trusted applications that are authorised to process the data entity and/or the second data and means for accessing a remote licensing server, encrypting the first data to produce first encrypted data; and
creating the data entity comprising the first encrypted data and the second encrypted data.

39. A publishing method as claimed in claim 38 in which encrypting comprises selecting one of a plurality of encryption algorithms to encrypt at least one of the first and second data.

40. A publishing method as claimed in claim 38, further comprising collating a plurality of data to be included in the data entity.

41. A publishing method as claimed in claim 40 in which the plurality of data comprises at least one of a unique identifier, a part number, a title, a publisher identifier, an artist identifier, an author, a digital content cover, pdf cover, a publication date, a skin outer, a skin HTML and data selected according to a predeterminable MIME-type.

42. A publishing method as claimed in claim 40 in which the plurality of data comprises at least one of a licensing process identifier which identifies the remote licensing server or process via which a user can gain access to the second encrypted data and a list of second local applications that are trusted to read or output the decrypted second data.

43. A publishing method as claimed in claim 40, comprising the step of compressing the collated data to produce the data entity.

44. A publishing method as claimed in claim 38, further comprising: creating licensing data comprising at least one of identification data to allow an identified party access to the second encrypted data, a price identifier which sets a price associated with manipulating the second encrypted data, a currency identifier which specifies a currency in which the price is stated, a licensing terms identifier which specifies terms of the license associated with reading or outputting the decrypted second data and an initial user interface.

45. A publishing method as claimed in claim 38, further comprising outputting the data entity to a merchant or customer.

46. A publishing system for producing a data entity, comprising:
means for receiving second data to be encrypted together with an encryption key, encrypting the second data to produce second encrypted data;
means for creating first data comprising at least a list of trusted applications that are authorised to process the data entity and/or the second data and means for accessing a remote licensing server, encrypting the first data to produce first encrypted data; and
means for creating the data entity comprising at least the first encrypted data and the second encrypted data entity.

47. A publishing system as claimed in claim 46 in which the means for encrypting comprises means for selecting one of a plurality of encryption algorithms to encrypt at least one of the first and second data.

48. A publishing system as claimed in claim 46 further comprising means for collating a plurality of data to be included in the data entity.

49. A publishing system as claimed in claim 48 in which the plurality of data comprising at least one of a unique identifier, a part number, a title, a publisher identifier, an artist identifier, an author, a digital content cover, pdf cover, a publication date, a skin outer, a skin HTML and data selected according to a predeterminable MIME-type.

50. A publishing system as claimed in claim 48 in which the plurality of data comprises at least one of a licensing process identifier which identifiers the remote licensing server or process via which a user can gain access to the second encrypted data; a list of second local applications that are trusted to read or output the decrypted second data.

51. A publishing system as claimed in claim 48 comprising means for compressing the collated data to produce the data entity.

52. A publishing system as claimed in claim 46 further comprising: means for creating licensing data comprises at least one of identification data to allow an identified party to access the second encrypted data, a price identifier which sets a price associated with manipulating the second encrypted data, a currency identifier which specifies a currency in which the price is stated, a licensing terms identifier which specifies terms of the license associated with reading or outputting the decrypted second data and an initial user interface.

53. A publishing system as claimed in claim 46 further comprising outputting the data entity to a merchant or customer.

54. A licensing method for granting authority to access data contained within an encrypted portion of a data entity, the method comprising:
receiving a request from a client machine upon which an attempt has been made to access second encrypted data of the data entity;
transmitting data to the client machine relating to a licensing process in which conditions applicable to manipulation of at least one of the data entity, first encrypted data and the second encrypted data are established; and
sending to the client the authorisation data via which controlled access can be gained to the data entity.

55. A licensing method as claimed in claim 54 in which the authorisation data is arranged to grant access to digital content contained with the second encrypted data.

56. A licensing server for granting authority to access data contained within an encrypted portion of a data entity comprising:
means for receiving a request from a client machine upon which an attempt has been made to access second encrypted data of the data entity;
means for transmitting data to the client machine relating to a licensing process in which conditions applicable to manipulation of at least one of the data entity, first encrypted data and second encrypted data are established; and
means for sending to the client authorisation data via which controlled access can be gained to the data entity.

57. A licensing server as claimed in claim 56 in which the authorisation data is arranged to grant access to digital content contained with the second encrypted data.

58. A licensing method for granting authority to access data contained within an encrypted portion of a data entity containing a reference to a licensing server, comprising:
receiving, at the licensing server, a request from a client machine upon which an attempt has been made to access second encrypted data of the data entity;
transmitting data to the client machine relating to a licensing process in which conditions applicable to manipulation of at least one of the data entity, first encrypted data and the second encrypted data are established; and
sending to the client authorisation data via which controlled access can be gained to the data entity.

59. A licensing method as claimed in claim 58 in which the authorisation data is arranged to grant access to digital content contained with the second encrypted data.

60. A licensing server for granting authority to access data contained within an encrypted portion of a data entity comprising a reference to the licensing server, comprising:
means for receiving a request from a client machine upon which an attempt has been made to access second encrypted data of the data entity;
means for transmitting data to the client machine relating to a licensing process in which conditions applicable to manipulation of at least one of the data entity, first encrypted data and second encrypted data are established; and
means for sending to the client authorisation data via which controlled access can be gained to the data entity.

61. A licensing server as claimed in claim 60 in which the authorisation data is arranged to grant access to digital content contained with the second encrypted data.

62. A computer program product comprising: a data entity comprising first encrypted data decodable by a first local application located at a first client machine, second encrypted data usable by a second local application, located at the first client machine, only after the first encrypted data has been decoded; the second encrypted data representing an encrypted version of digital content comprising instructions; the digital content being capable of being rendered by an associated application which comprises means for giving effect to the instructions.

63. A computer program product comprising: first encrypted data decodable by a first local application located at a first client machine, second encrypted data usable by a second local application, located at the first client machine, only after the first encrypted data has been decoded; the second encrypted data representing an encrypted version of digital content comprising instructions; the digital content being capable of being rendered by an associated application which comprises means for giving effect to the instructions for rendering said instructions ineffective.

64. A data processing system comprising: digital content comprising instructions that are capable of being rendered by an associated application which comprises means for giving effect to the instructions; means for receiving a data entity comprising first encrypted data decodable only by a first local application located at a first client machine; second encrypted data usable by a second local application, located at the first client machine, only after the first encrypted data has been decoded; the second encrypted data representing an encrypted version of the digital content; the second application being capable of rendering the digital content and lacking the means for giving effect to the instructions.

* * * * *

UNITED STATES PATENT AND TRADEMARK OFFICE
CERTIFICATE OF CORRECTION

| | | |
|---|---|---|
| PATENT NO. | : 7,210,039 B2 | Page 1 of 1 |
| APPLICATION NO. | : 10/380365 | |
| DATED | : April 24, 2007 | |
| INVENTOR(S) | : Rodgers et al. | |

It is certified that error appears in the above-identified patent and that said Letters Patent is hereby corrected as shown below:

In The Claims:

Column 69, Claim 28, Line 15:  Please correct "comprising"
                                To read -- comprises--

Column 69, Claim 34, Line 51:  Please correct "comprising"
                                To read --comprising:--

Column 71, Claim 49, Line 2:   Please correct "comprising"
                                To read -- comprises--

Column 71, Claim 52, Line 17:  Please correct "comprises"
                                To read -- comprising--

Signed and Sealed this

Seventh Day of August, 2007

JON W. DUDAS
*Director of the United States Patent and Trademark Office*